(12) United States Patent
Omojola et al.

(10) Patent No.: US 10,467,615 B1
(45) Date of Patent: Nov. 5, 2019

(54) FRICTION-LESS PURCHASING TECHNOLOGY

(71) Applicant: Square, Inc., San Francisco, CA (US)

(72) Inventors: Ayokunle Omojola, San Francisco, CA (US); Daniel Federman, San Francisco, CA (US); Sean Slinsky, San Francisco, CA (US); Marcelo Cortes, Kitchener, CA (US); Daniele Perito, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 568 days.

(21) Appl. No.: 14/871,576

(22) Filed: Sep. 30, 2015

(51) Int. Cl.
 *G06Q 20/32* (2012.01)
(52) U.S. Cl.
 CPC .................................. *G06Q 20/322* (2013.01)
(58) Field of Classification Search
 None
 See application file for complete search history.

(56) References Cited

U.S. PATENT DOCUMENTS

| | | | |
|---|---|---|---|
| 6,330,550 B1 | 12/2001 | Brisebois et al. | |
| 7,606,734 B2 | 10/2009 | Baig et al. | |
| 7,716,129 B1 | 5/2010 | Tan et al. | |
| 8,140,418 B1 | 3/2012 | Casey et al. | |
| 8,332,314 B2 | 12/2012 | Griffin | |
| 8,447,666 B1 | 5/2013 | Keld | |
| 8,539,568 B1 | 9/2013 | Milas | |
| 8,571,975 B1 | 10/2013 | Lehman et al. | |
| 8,606,703 B1 * | 12/2013 | Dorsey | G06Q 40/02 705/39 |
| 8,639,621 B1 | 1/2014 | Ellis et al. | |
| 8,682,297 B2 | 3/2014 | Chevsky et al. | |

(Continued)

FOREIGN PATENT DOCUMENTS

| | | |
|---|---|---|
| EP | 2 945 410 A1 | 11/2015 |
| KR | 10-2000-0072676 A | 12/2000 |

(Continued)

OTHER PUBLICATIONS

Final Office Action dated Mar. 23, 2016, U.S. Appl. No. 14/283,504, of Wilson, J., et al., filed May 21, 2014.

(Continued)

*Primary Examiner* — Abhishek Vyas
(74) *Attorney, Agent, or Firm* — Lee & Hayes, P.C.

(57) ABSTRACT

Disclosed are a system and a method for purchasing items from a merchant system using friction-less payment processing technology. A user initiates a purchase transaction from a user interface of the merchant system by submitting an indication or intent to use payment proxy in lieu of payment information or login credentials or signing-into accounts. An auto-payment component then generates a payment request including the payment proxy and sends the request to a payment service system. The payment service system uses the payment proxy to identify a financial account associated with the customer and the merchant. The payment service system initiates a transfer of a payment amount associated with the purchase transaction from a financial account associated payment proxy to a financial account associated with the merchant system to pay for the purchase transaction.

23 Claims, 14 Drawing Sheets

(56) References Cited

U.S. PATENT DOCUMENTS

| | | | |
|---|---|---|---|
| 8,688,540 B1 | 4/2014 | Patel et al. | |
| 9,275,419 B1 | 3/2016 | Aguiar Marcano | |
| 9,300,643 B1 | 3/2016 | Doane | |
| 9,324,067 B2 | 4/2016 | Van Os et al. | |
| 9,342,831 B1 | 5/2016 | Davis et al. | |
| 9,483,763 B2 | 11/2016 | Van Os et al. | |
| 9,773,212 B2 | 9/2017 | Hammad | |
| 9,917,802 B2 | 3/2018 | Melzer et al. | |
| 9,922,380 B2 | 3/2018 | Isaacson et al. | |
| 9,922,381 B2 | 3/2018 | Isaacson et al. | |
| 9,934,502 B1 | 4/2018 | Grassadonia et al. | |
| 10,068,221 B1 | 9/2018 | Thomas et al. | |
| 2002/0029342 A1 | 3/2002 | Keech | |
| 2002/0111907 A1 | 8/2002 | Ling | |
| 2002/0147658 A1 | 10/2002 | Kwan | |
| 2003/0217005 A1 | 11/2003 | Drummond et al. | |
| 2004/0267660 A1 | 12/2004 | Greenwood et al. | |
| 2005/0021400 A1 | 1/2005 | Postrel | |
| 2005/0050145 A1 | 3/2005 | Lowe | |
| 2005/0192893 A1 | 9/2005 | Keeling et al. | |
| 2005/0273626 A1 | 12/2005 | Pearson et al. | |
| 2006/0006226 A1 | 1/2006 | Fitzgerald et al. | |
| 2006/0208066 A1 | 9/2006 | Finn et al. | |
| 2007/0011104 A1 | 1/2007 | Leger et al. | |
| 2007/0119918 A1 | 5/2007 | Hogg et al. | |
| 2007/0192191 A1 | 8/2007 | Neal et al. | |
| 2007/0203836 A1* | 8/2007 | Dodin | G06Q 20/02 705/44 |
| 2007/0271342 A1* | 11/2007 | Brandt | G06Q 10/107 709/206 |
| 2008/0059375 A1 | 3/2008 | Abifaker | |
| 2008/0177659 A1 | 7/2008 | Laccy et al. | |
| 2008/0189186 A1 | 8/2008 | Choi et al. | |
| 2008/0276308 A1 | 11/2008 | Graser et al. | |
| 2010/0017334 A1 | 1/2010 | Itoi et al. | |
| 2010/0121764 A1 | 5/2010 | Niedermeyer | |
| 2010/0131409 A1 | 5/2010 | Lawyer et al. | |
| 2010/0186066 A1 | 7/2010 | Pollard | |
| 2010/0250687 A1 | 9/2010 | Smith et al. | |
| 2011/0022472 A1 | 1/2011 | Zon | |
| 2011/0035287 A1 | 2/2011 | Fox | |
| 2011/0047045 A1 | 2/2011 | Brody et al. | |
| 2011/0082767 A1 | 4/2011 | Ryu et al. | |
| 2011/0113029 A1 | 5/2011 | Kaal | |
| 2011/0113068 A1 | 5/2011 | Ouyang et al. | |
| 2011/0119155 A1 | 5/2011 | Harm-Lad et al. | |
| 2011/0238539 A1 | 9/2011 | Phillips et al. | |
| 2011/0287726 A1 | 11/2011 | Huang | |
| 2011/0307388 A1 | 12/2011 | Kim et al. | |
| 2012/0016678 A1 | 1/2012 | Gruber et al. | |
| 2012/0036042 A1 | 2/2012 | Graylin et al. | |
| 2012/0101896 A1 | 4/2012 | Veeneman et al. | |
| 2012/0130898 A1 | 5/2012 | Snyder et al. | |
| 2012/0131121 A1 | 5/2012 | Snyder et al. | |
| 2012/0143722 A1 | 6/2012 | John | |
| 2012/0166334 A1 | 6/2012 | Kimberg et al. | |
| 2012/0226588 A1 | 9/2012 | Wuhrer et al. | |
| 2012/0295580 A1* | 11/2012 | Corner | H04W 12/12 455/405 |
| 2012/0310752 A1 | 12/2012 | Gaddis | |
| 2012/0323717 A1 | 12/2012 | Kirsch | |
| 2013/0041821 A1 | 2/2013 | Kingston et al. | |
| 2013/0046707 A1 | 2/2013 | Maskatia et al. | |
| 2013/0054395 A1 | 2/2013 | Cyr et al. | |
| 2013/0080415 A1 | 3/2013 | Maskatia et al. | |
| 2013/0085804 A1 | 4/2013 | Leff et al. | |
| 2013/0138535 A1 | 5/2013 | Hsiao | |
| 2013/0204993 A1 | 8/2013 | Uribe-Etxebarria Jimenez | |
| 2013/0297425 A1 | 11/2013 | Wallaja | |
| 2013/0305367 A1 | 11/2013 | Yoshioka et al. | |
| 2014/0019290 A1 | 1/2014 | Beaver | |
| 2014/0019352 A1 | 1/2014 | Shrivastava | |
| 2014/0052633 A1 | 2/2014 | Gandhi | |
| 2014/0058939 A1* | 2/2014 | Savla | G06Q 20/227 705/42 |
| 2014/0108263 A1 | 4/2014 | Ortiz et al. | |
| 2014/0164254 A1 | 6/2014 | Dimmick | |
| 2014/0180826 A1 | 6/2014 | Boal | |
| 2014/0201067 A1 | 7/2014 | Lai et al. | |
| 2014/0236838 A1 | 8/2014 | Asar et al. | |
| 2014/0337207 A1 | 11/2014 | Zhang et al. | |
| 2014/0351126 A1 | 11/2014 | Priebatsch | |
| 2015/0006529 A1 | 1/2015 | Kneen et al. | |
| 2015/0052062 A1 | 2/2015 | Flomin et al. | |
| 2015/0088998 A1 | 3/2015 | Isensee et al. | |
| 2015/0095990 A1 | 4/2015 | Ranganathan et al. | |
| 2015/0127526 A1 | 5/2015 | Ye et al. | |
| 2015/0134518 A1 | 5/2015 | Turovsky et al. | |
| 2015/0269575 A1 | 9/2015 | Narayanan et al. | |
| 2015/0304250 A1* | 10/2015 | Zomet | G06Q 30/0277 705/14.72 |
| 2015/0332230 A1 | 11/2015 | Gaines et al. | |
| 2015/0339656 A1 | 11/2015 | Wilson et al. | |
| 2015/0339666 A1 | 11/2015 | Wilson et al. | |
| 2015/0339668 A1 | 11/2015 | Wilson et al. | |
| 2015/0348002 A1 | 12/2015 | Van Os et al. | |
| 2015/0371223 A1 | 12/2015 | Li et al. | |
| 2016/0117651 A1 | 4/2016 | Davis | |
| 2016/0117665 A1 | 4/2016 | Davis | |
| 2016/0117666 A1 | 4/2016 | Davis et al. | |
| 2016/0117670 A1 | 4/2016 | Davis | |
| 2016/0125371 A1* | 5/2016 | Grassadonia | G06Q 20/0855 705/44 |
| 2016/0171481 A1* | 6/2016 | McElmurry, IV | G06Q 20/3255 705/39 |
| 2016/0180316 A1* | 6/2016 | Wang | G06Q 20/22 705/39 |
| 2016/0180325 A1 | 6/2016 | Davis et al. | |
| 2016/0224967 A1 | 8/2016 | Davis et al. | |
| 2016/0283936 A1 | 9/2016 | Daniel et al. | |
| 2016/0335532 A1 | 11/2016 | Sanghavi et al. | |
| 2016/0360039 A1* | 12/2016 | Sanghavi | H04M 3/5183 |
| 2017/0004588 A1 | 1/2017 | Isaacson et al. | |
| 2017/0011383 A1* | 1/2017 | Melzer | G06Q 10/10 |
| 2017/0063825 A1 | 3/2017 | Jeong et al. | |
| 2018/0218356 A1 | 8/2018 | Grassadonia et al. | |

FOREIGN PATENT DOCUMENTS

| | | |
|---|---|---|
| WO | 2015/179681 A1 | 11/2015 |
| WO | 2017/103326 A1 | 6/2017 |
| WO | 2018/140272 A1 | 8/2018 |

OTHER PUBLICATIONS

Non-Final Office dated Apr. 6, 2016, U.S. Appl. No. 14/284,224, of Wilson, J., et al., filed May 21, 2014.

Non-Final Office Action dated Dec. 1, 2015, U.S. Appl. No. 14/283,504, of Wilson, J., et al., filed May 21, 2014.

Restriction Requirement dated Dec. 3, 2015, for U.S. Appl. No. 14/284,224, of Wilson, J., et al., filed May 21, 2014.

"In App Purchase Programming Guide," Apple Inc., Rapid Ideas, dated Jun. 17, 2011, Retrieved from the Internet URL: https://www.rapid-ideas.com/previews/wsa/page9/files/StoreKitGuide.pdf, on Sep. 23, 2016, pp. 1-38.

Non-Final Office Action dated Oct. 4, 2016, for U.S. Appl. No. 14/283,504, of Wilson, J., et al., filed May 21, 2014.

Final Office Action dated Oct. 6, 2016, for U.S. Appl. No. 14/284,224, of Wilson, J., et al., filed May 21, 2014.

Final Office Action dated May 30, 2017, for U.S. Appl. No. 14/283,504, of Wilson, J., et al., filed May 21, 2014.

Final Office Action dated Jul. 12, 2017, for U.S. Appl. No. 14/283,617, of Wilson, J., et al., filed May 21, 2014.

Non-Final Office Action dated Dec. 5, 2016, for U.S. Appl. No. 14/283,617, of Wilson, J., et al., filed May 21, 2014.

Advisory Action dated Dec. 27, 2016, for U.S. Appl. No. 14/284,224, of Wilson, J., et al., filed May 21, 2014.

Non-Final Office Action dated Dec. 16, 2014, U.S. Appl. No. 14/283,504, of Wilson, J., et al., filed May 21, 2014.

(56) References Cited

OTHER PUBLICATIONS

Final Office Action dated Apr. 21, 2015, U.S. Appl. No. 14/283,504, of Wilson, J., et al., filed May 21, 2014.
International Search Report and Written Opinion for PCT Application No. PCT/US2015/032030, dated Aug. 31, 2015.
Non-Final Office Action dated Apr. 7, 2017, for U.S. Appl. No. 14/284,224, of Wilson, J., et al., filed May 21, 2014.
Notice of Allowance dated Nov. 30, 2017, for U.S. Appl. No. 14/284,224, of Wilson, J., et al., filed May 21, 2014.
Non-Final Office Action dated Mar. 8, 2018, for U.S. Appl. No. 14/283,617, of Wilson, J., et al., filed May 21, 2014.
"Facebook Messenger Promotes P2P Payments," BI Intelligence—Finance, dated Sep. 23, 2016, Business Insider, pp. 1-4.
"PayPal's first payments bot is a Slack app," TechCrunch, dated Feb. 7, 2017, retrieved from Internet URL: https://techcrunch.com/2017/02/07/paypals-first-payments-bot-is-a-slack-app/, on Jun. 30, 2017, pp. 1-8.
"The latest from Apple and Google in mobile AP Is for developing native applications," BBVAOpen4u.com, dated Nov. 10, 2016, Retrieved from Internet URL: https://bbvaopen4u.com/en/actualidad/latest-apple-and-google-mobile-apis-developing-native-applications, on May 7, 2018, pp. 1-9.
Barbosa, G., "Square Cash update includes promised Messages app plus Siri integration," 9to5 Mac, dated Sep. 13, 2016, Retrieved from Internet USL: https://9to5mac.com/2016/09/13/square-cash-messsages-app-siri/, on May 9, 2018, pp. 1-3.
Chowdhry, A., "Apple Patent Highlights an iMessage Payment Service," Forbes Tech, dated Jan. 7, 2016, Retrieved from Internet URL: https://www.forbes.com/sites/amitchowdhry/2016/01/07/apple-pay-with-imessage/#6c352c3a190b, on May 9, 2018, pp. 1-3.
Constine, J., "Facebook Introduces Free Friend-To-Friend Payments Through Messages," TechCrunch, dated Mar. 17, 2015, Retrieved from Internet URL: https://techcrunch.com/2015/03/17/facebook-pay/, on Oct. 4, 2017, pp. 1-5.
Constine, J., "Facebook Messenger Adds Group Chat Polls and AI Payment Suggestions," TechCrunch, dated Sep. 22, 2016, Retrieved from Internet URL: https://techcrunch.com/2016/09/22/messenger-polls/, on Oct. 4, 2017, pp. 1-3.
Crook, J., "Apple launches iMessage Apps so third-party devs can join your convos," TechCrunch, dated Jun. 13, 2016, Retrieved from Internet URL: https://techcrunch.com/2016/06/13/apple-launches-imessage-apps-so-third-party-devs-can-get-join-your-convos/, on May 9, 2018, pp. 1-2.
Fuhrmeister, C., "Apple Wants to Help You Split the Check With iMessage," EATER, dated Jun. 15, 2016, Retrieved from Internet URL: https://www.eater.com/2016/6/15/11950264/splitting-checks-imessage-apple-square, on Oct. 4, 2017, pp. 1-2.
Goel, V., "Apple to Offer App Developers Access to Sid and iMessage," The New York Times, dated Jun. 13, 2016, Retrieved from Internet URL: https://www.nytimes.com/2016/06/14/technology/apple-to-offer-app-developers-access-to-siri-and-imessage.html, on May 9, 2018, pp. 1-2.
Austin P.L., "Apple Just Added One More Way to Repay Your Friends," Lifehacker, dated Jun. 5, 2017, pp. 1-3.
Madore, P.H., "Apple Patent Reveals Siri-Assisted iMessage P2P Payments Platform," Hacked: Hacking Finance, Artificial Intelligence, dated Nov. 17, 2016, Retrieved from Internet URL: https://hacked.com/apple-patent-reveals-siri-assisted-imessage-p2p-payments-plafformt, on Oct. 4, 2017, pp. 1-5.
Peckham, J., "Apple is opening up Siri, i Message and Maps—here's why that's a great thing," Tech Radar, dated Jun. 13, 2016, Retrieved from Internet URL: https://www.techradar.com/news/phone-and-communications/mobile-phones/apple-is-opening-up-siri-imessage-and-maps-here-s-why-that-s-a-great-thing-1323325, on May 9, 2018, pp. 1-4.
Quoc, M., "11 Examples of Conversational Commerce and Chatbots," Chatbots Magazine by Octane AI, dated May 31, 2016, Retrieved from Internet URL: https://chatbotsmagazine.com/11-examples-of-conversational-commerce-57bb8783d332, on May 7, 2018, pp. 1-24.
Rao, L., "Square Cash Users Will Be Able to Send Money Via Apple iMessage," Fortune, Jun. 13, 2016, Retrieved from Internet URL: http://fortune.com/2016/06/13/square-cash-apple/, on May 9, 2018, pp. 1-6.
Statt, N., "Facebook's AI Assistant Will Now Offer Suggestions Inside Messenger," The Verge, dated Apr. 6, 2017, Retrieved from Internet URL: https://www.theverge.com/2017/4/6/15200836/facebook-messenger-m-suggestions-ai-assisant, on Oct. 4, 2017, pp. 1-5.
Tepper, F., "You Can Now Send Your Friends Money Inside iMessage," TechCrunch, dated Jun. 5, 2017, Retrieved from Internet URL: https://techcrunch.com/2017/06/05/you-can-now-send-your-friends-money-inside-imessage/, on Oct. 4, 2017, pp. 1-3.
Wagner, K., "Facebook Messenger Adds Peer-to-Peer Payments Feature," Recode, dated Mar. 17, 2015, Retrieved from Internet URL: https://www.recode.net/2015/3/17/11560350/facebook-messenger-adds-peer-to-peer-payments-feature, on Oct. 4, 2017, pp. 1-3.
Yeung, K., "Facebook Adds Group Payments to Messenger," VentureBeat, dated Apr. 11, 2017, Retrieved from Internet URL: https://venturebeat.com/2017/04/11/facebook-adds-group-payments-to-messenger/, on Oct. 4, 2017, pp. 1-3.
Yeung, K., "Facebook Messenger Gets Polls and Now Encourages Peer-to-Peer Payments," VentureBeat, dated Sep. 22, 2016, Retrieved from Internet URL: https://venturebeat.com/2016/09/22/facebook-messenger-gets-polls-and-a-new-way-to-get-you-to-send-money/, Oct. 4, 2017, pp. 1-5.
Non-Final Office Action dated Mar. 28, 2017, for U.S. Appl. No. 15/419,921, of Grassadonia, B., et al., filed Jan. 30, 2017.
Final Office Action dated Aug. 31, 2017, for U.S. Appl. No. 15/419,921, of Grassadonia, B., et al., filed Jan. 30, 2017.
Non-Final Office Action dated Oct. 26, 2017, for U.S. Appl. No. 15/640,245, of Wilson, J., et al., filed Jun. 30, 2017.
Notice of Allowance dated Nov. 16, 2017, for U.S. Appl. No. 15/419,921, of Grassadonia, B., et al., filed Jan. 30, 2017.
Non-Final Office Action dated Mar. 22, 2018, for U.S. Appl. No. 14/946,544, of Omojola, A., et al., filed Nov. 19, 2015.
Final Office Action dated May 16, 2018, for U.S. Appl. No. 15/640,245, of Wilson, J., et al., filed Jun. 30, 2017.
Partial International Search Report for International Application No. PCT/US2018/014126, dated May 7, 2018.
Final Office Action dated Sep. 21, 2018, for U.S. Appl. No. 14/946,544, of Omojola, A., et al., filed Nov. 19, 2015.
Non-Final Office Action dated Oct. 4, 2018, for U.S. Appl. No. 15/640,245, of Wilson, J., et al., filed Jun. 30, 2017.
Advisory Action dated Jan. 25, 2019, for U.S. Appl. No. 14/946,544, of Omojola, A., et al., filed Nov. 19, 2015.
International Search Report and Written Opinion for International Application No. PCT/US2018/014126, dated Jul. 16, 2018.

* cited by examiner

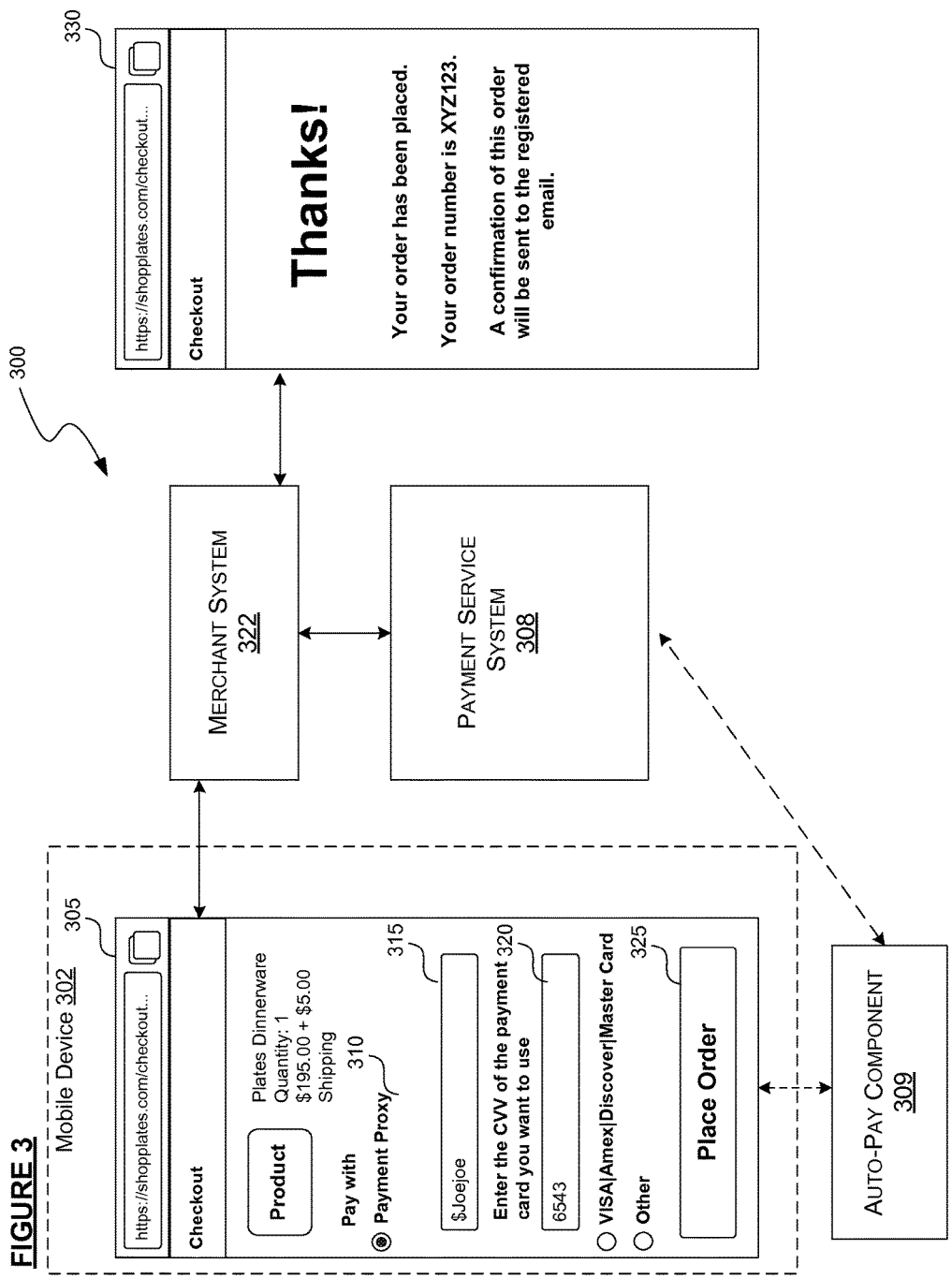

FRICTION-LESS PURCHASING TECHNOLOGY

TECHNICAL FIELD

Online merchants provide a variety of checkout options for customers. A typical checkout experience for a new customer shopping on a website includes signing up for an account by setting up a username and password, providing payment information relating to a debit or credit card and billing and shipping information and then placing an order. The payment information is typically saved under the account to allow returning customers to sign in and place an order using the payment information stored under the account. These checkout experiences for new and returning customers require customers to go through multiple steps and can thus discourage customers from completing a purchase transaction.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

FIG. 3 is a block diagram illustrating an example purchase flow in accordance with an embodiment of the friction-less purchasing technology.

DETAILED DESCRIPTION

Figure 1:
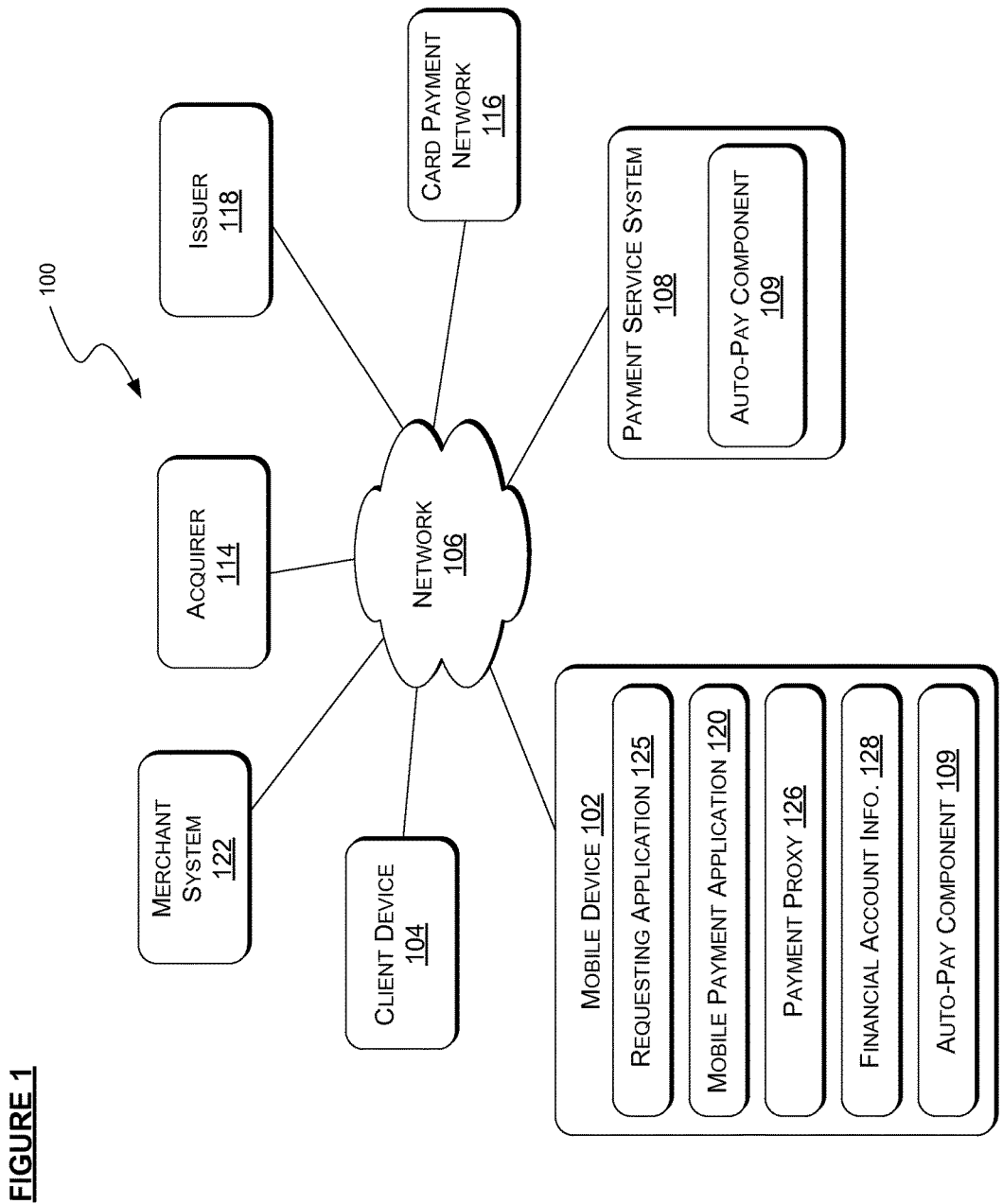
FIG. 1 is a network diagram illustrating an environment in which the friction-less purchasing technology can be implemented.

Some embodiments described herein include systems and methods for purchasing items online by selecting a payment field (e.g., in a shopping form), where the selection causes the payment field to be populated with a payment request, which is either directly submitted to a payment service or routed to an application stored thereon for further processing (hereinafter "friction-less purchasing technology"). Thus, a customer making purchases on a website displaying merchant's products or services or through a merchant application uses 'limited taps or clicks' to authorize purchase by a payment card connected thereto.

Consider a scenario in which a customer selects items on a website associated with a merchant or a service provider, adds the selected items in a virtual shopping cart, and asks for the purchased items to be delivered to the customer's address of choice. Generally, to conduct these transactions, users typically have to enter any number of parameters (e.g., transaction participants, desired items, payment amounts, financial account information, etc.). However, providing such input can be cumbersome or otherwise burdensome for a user, particularly when attempting to enter these parameters on a device with limited input/output capabilities such as a mobile phone.

Some conventional solutions provide a 'buy' or 'purchase' button for ease of payment on the merchant website. On selecting the button, the merchant website transfers the flow from its website interface to an interface of another website connected to the button. The customer is then asked to either provide login credentials or create an account on the other website. Once registered, the customer can pay for the items by using a payment card on file. After the payment transactions, the process does not transition back to the merchant website, making the customer re-open the shopping website in case he or she wishes to continue shopping. Further, multiple user interactions with the interfaces making the option less favorable for the customer to use. Due to at least the problems mentioned above, the purchasing conversion rate (based on a user adding the items to a cart and checking out) on mobile e-commerce portals is significantly lower than the purchasing conversion rate on a desktop computer or a brick-and-mortar point of sale system.

The systems and methods described herein help eliminate the disadvantages associated with the conventional systems discussed above, among other things. In one implementation, the methods and systems include providing a payment field that is either pre-populated with a payment request, including an identifier indicative of a financial account of the customer, or allows for entry of the identifier. In another implementation, the payment field, when selected transfers the process control from the interface of the merchant application to a pre-authenticated mobile payment application (which can either be a software installed on the customer device or a webpage associated with a payment service). The mobile payment application has stored thereon financial information associated with the customer along with login credentials. Optionally, the mobile payment application invokes a payment service to obtain such information. The mobile payment application can be associated with an identifier of payment card information (e.g., a proxy), thus allowing the customer to process the transaction seamlessly, without requiring the customer to sign into the mobile application or payment card information and with limited input from the customer. In some cases, the customer is asked to verify the transaction (e.g., with a three-digit verification number, email address, a phone number, an answer to a security question and so on) within the secure boundaries of the mobile payment application. Once the payment is made through the selection of the payment field, the process transitions back to the merchant website, thus facilitating a single-action purchasing transaction, from the perspective of the customer As mentioned above, the payment request includes details of the order placed by a customer prior to selection, a unique payment proxy associated with a merchant behind the website, and a payment proxy associated with the customer. In this example, the payment proxy is created in response to, for example, the user registering for a money transfer service via the tagging mechanism. Payment proxy refers to a communication identifier, e.g., email address, phone number, or in general any payment identifier associated with a financial or bank account of the customer or sender. As used here, the term "tagging" refers to a marking of an alphanumeric character (or a string of alphanumeric characters) to identify it (i.e., the character or string) for treatment in a specified way. In one example, the payment proxy can include an alphanumeric character (or a string of alphanumeric characters) and a monetary indicator (e.g., "$", ",", etc.) preceding the alphanumeric character. The term "alphanumeric character" as used here refers to a symbol that can be a number (i.e., numeric), a letter (i.e., alphabetic), or a combination thereof. The currency indicator can correspond to various currencies, e.g., dollar ($), euro (€), pound (£), rupee M, yuan (¥), etc. Although use of the dollar currency indicator ($) is used herein, it is to be understood that any currency symbol could equally be used Indicators, such as "@" in an e-mail address, or monetary indicator in the payment proxy, operate as the tagging mechanism that indicates to a computer system to treat the inputs as a request from the sender to access the sender's financial account to transfer funds from sender's account into a recipient's account, where detection of the syntax (which includes one or more alphanumeric characters tagged by a monetary currency indicator, or an email address, or a phone number) triggers a transfer of funds between the customer and merchant. Thus, when used, the payment proxy by and of itself is capable of initiating payment transactions without the merchant or customer having to submit or enter credit card, debit card, actual bank account information, or the like. Briefly described, the tagging technology enables a sender, who desires to send cash to a recipient, to trigger a money transfer by specifying, in any communication message, an amount and a recipient using one or more inputs having a particular syntax. The syntax includes a monetary currency indicator (or "currency indicator") prefixing one or more alphanumeric characters. The currency indicator operates as the tagging mechanism that indicates to a computer system to treat the inputs as a request from the sender to transfer cash, where detection of the syntax (which includes one or more alphanumeric characters tagged by a monetary currency indicator) triggers a transfer of cash. T In some embodiments, the selection of the payment field may further include, by inference, a verification action, which can be a submission of a security code associated with a payment card or payment account when placing an online order. In other embodiments, the single verification action can be responding to a confirmation request (e.g., a push notification, an email message, a text message, etc.) or a permission request. In yet another embodiment, the verification action can be a submission of an identifier of biometric characteristic unique to the customer; examples of biometric characteristics include a fingerprint, retina, image, voice spectrum, etc. The disclosed technology employs one or more of these verification actions to identify and block fraudulent transactions and provide customers engaging in legitimate transactions a faster and efficient checkout experience that does not involve signing in or registering for an account.

The friction-less purchasing technology, in some embodiments, enables a customer to use a customer device (e.g., a mobile phone) to place an online order for items from a merchant website or a web application associated with a "merchant system", without creating an account or signing in to an account. Instead, the customer device and/or a payment service through the friction-less purchasing technology automatically populate a payment field (such as online interactive payment button) with a payment request on behalf of the customer. The payment request includes details of the order placed by a customer, payment proxy associated with the merchant behind the website, and/or a payment proxy associated with the customer. The payment proxies of the merchant and the customer enables a customer to use the payment proxy linked to a payment card stored either locally or in the payment service to complete the checkout process. The payment request may be in the form of a hyperlink or deep-link or in general, any encrypted payment packet that includes within the link or packet the relevant information stored in the merchant system, or in a memory location on the computing device being accessed by the customer, in a payment service, or in a memory location associated with a web browser being used to view the merchant's website. In some embodiments, the relevant information is retrieved based on a context database that can store an arrangement of content, content addresses, user defined attributes (e.g., metadata, tags, ratings, etc.), persistent data (e.g., browser history, cookies, etc.). The user defining the context can authorize or authenticate access to the context database.

When the customer submits the order, the friction-less purchasing system implementing the disclosed technology receives the payment request to initiate a payment transaction from the populated payment field. As mentioned, the payment request can include the merchant's and customer's payment proxies and details of the order from the merchant system. In some cases, the friction-less purchasing system can send a text or email notification using customer provided contact information to confirm or reject the order. Additionally or alternatively, if the customer has a mobile application installed on his or her mobile device, the purchasing system, by accessing the deep-link in the payment field, can locate the mobile application on the mobile device and send a push notification to the customer's mobile device requesting the customer to confirm or cancel the online order. If the customer confirms the order, the friction-less purchasing system processes the payment request from the merchant system by initiating a transfer of an amount of funds corresponding to the payment request from a bank account associated with the payment proxy of the customer to a bank account associated with the payment proxy of the merchant.

In some embodiments, the friction-less purchasing technology allows a customer to place an order for items with a merchant system using a payment proxy linked to a payment card on file with the purchasing system and optionally, a security code (e.g., a card verification value) associated with the payment proxy. When the customer places an order with the merchant system in the disclosed manner, the friction-less purchasing system receives a payment request including other pieces of information and details of the order (e.g., order identifier, order amount, pre-tax amount, sales tax amount, shipping cost, description and quantity of items ordered, etc.) from the merchant system. The purchasing system then checks that the payment proxy is mapped to a valid payment card and the security code included frictionless purchasing system processes the payment request from the merchant system by initiating a transfer of an amount of funds corresponding to the payment request from a bank account associated with the payment card to a bank account associated with the merchant system.

In some embodiments, the friction-less purchasing technology enables a customer to order items from a merchant application ("requesting application") on a mobile device by using a mobile payment application, e.g., a forum, a social networking website, a landing page, or an application installed on the same mobile device as the application associated with the payment method or checkout option. The mobile payment application appears as a payment option or payment field on the checkout user interface of the requesting application. When the mobile payment application is selected as the payment method, a deep-link within the payment field determines whether a mobile payment application is installed or authenticated by a web browser. Contemporaneously or subsequently, the payment service authorizes and invokes the mobile payment application and causes it to come to the foreground of the mobile device, while the requesting application goes into the background. Based on information in the deep-link associated with the mobile payment application, the mobile payment application indicates a summary of order and a request of confirmation for the order, in response to which the payment service either processes or cancels the transaction. In some embodiments, the customer can enter an authorization code on an interface presented by the mobile payment application to authorize the payment transaction. In some cases, the payment service updates the deep-link and appends to the deep-link with the confirmation number of the order, a reference number for the transaction, and a URL pointing back to the requesting application, or a new page in the web browser. The mobile payment service sees the updated deep-link or the payment service directly after processing transitions a new page or the requesting application in the web browser. The customer can also permit the requesting application to use the mobile payment application as a payment method in the current transaction or in the current and future transactions. In some embodiments, the mobile payment application can provide one or more user interfaces for managing settings and permissions associated with various requesting applications, tracking payment requests initiated from the requesting applications, or the like.

As described above, the disclosed technology enhances the checkout experience for customers by removing account registration and sign-in barriers. Because the disclosed technology uses mapping or association between a payment proxy and one or more payment cards or bank accounts to process payment requests from merchant systems, customers provide minimal information to complete the checkout process. Moreover, the disclosed technology enables the checkout process to be completed in a shorter amount of time with or without using a single verification action. Research shows that a consumer interacts with his mobile device for about 60 seconds. The more the interactive fields, the more interaction energy is required from the consumer. The friction-less purchasing technology reduces the overall interaction time to less than 40 seconds by removing the need to register or sign-in every single time.

While the embodiments described herein may relate to online shopping via merchant websites or applications, it will be understood that the embodiments can be extended to shopping at any e-commerce location, including brick-and-mortal retail stores using point-of-sale terminals, for example at self-check out terminals.

Various embodiments and implementations of the disclosed purchasing technology are now described. The following description provides specific details for a thorough understanding and an enabling description of these implementations. One skilled in the art will understand, however, that the disclosed system and methods may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the disclosed system and methods. Some frequently used terms are now described.

As used herein, a merchant may include any business engaged in the offering of goods or services for acquisition by customers. Actions attributed to a merchant may include actions performed by owners, employees, or other agents of the merchant and thus no distinction is made herein unless specifically discussed. In addition, as used herein, a customer may include any entity that acquires goods or services from a merchant, such as by purchasing, renting, leasing, borrowing, licensing, or the like. Hereinafter, goods and/or services offered by merchants may be referred to as items. Thus, a merchant and a customer may interact with each other to conduct a transaction in which the customer acquires an item from a merchant, and in return, the customer provides payment to the merchant.

As used herein, a 'payment transaction' or simply 'transaction' may include a financial transaction for the acquisition of goods and/or services that is conducted between a customer and a merchant. For example, when paying for a transaction, the customer can provide the amount that is due to the merchant using a payment proxy. In other cases, the payment transaction includes transfer of money from one party to another for any number of reasons. Thus, while the description refers to as customer and merchant as parties to the payment transaction, it will be understood that the parties can be a sender-a recipient, a land lord-renter, a bank-bank customer, a first friend and a second friend, and so on.

The term "payment card' or 'payment object' refers to a payment mechanism that includes a conventional debit card, a conventional credit card, a prepaid gift card, or the like, a smartcard that has an embedded integrate circuit chip (e.g., Europay-MasterCard-visa (EMV) card), a proxy card, or any card that functions as a combination of any of these mechanisms. The term "proxy card" as used herein refers to a card that may or may not bear a card number/account number that appears to be that of a real credit or debit card account (i.e., it is in the correct format), but where that card/account number is actually only a proxy for the customer's real card/account number. Additionally, the payment card used in the example above is a specific type of a financial instrument. Other types of financial instruments, other than the payment card, can be used to initiate the transfer of funds. An example of another type of a financial instrument is a biometrically identifiable instrument initialized by a biometric characteristic, such as a person's finger (e.g., for fingerprint recognition), face, iris or retina, heartbeat, voice, etc. Alternatively, a financial instrument can be a software instrument or virtual instrument, such as a virtual wallet. Other examples of payment card may also include a prepaid card, a gift card, a rewards card, a loyalty points' card, a frequent flyer miles card, a check, cash, or any other kind of payment instrument that holds financial value or provides a promise to pay at a later time. Payment card may also include a payment object, such as an electronic device configured to initiate contactless payment transactions, e.g., a key fob, a mobile device (such as a mobile device having an NFC tag). And finally, the payment object can also be a payment proxy having a syntax of a monetary indicator followed by a string of alphanumeric characters or in general, any identifier that is representative of the customer or merchant's financial account. The payment proxy can be used in the context of and within a webpage as part of the web address, a social networking handle or username, a forum, a messaging application, and so on.

The term "landing page," as used here, refers to a virtual location identified by a personalized location address that is dedicated to collect payments on behalf of a recipient associated with the personalized location address. The personalized location address can include the payment proxy discussed above. In some embodiments, the landing page is identified by a uniform resource locator (URL) that includes a payment proxy, where the URL is accessible through a web browser application installed on a client device of the sender. For example, the URL is www . . . com/charityName. In another example, the URL is www . . . com/aaron. In some embodiments, the landing page is identified by a graphical user interface (GUI) of a mobile payment application installed on a client device of the sender. For example, the GUI of the mobile payment application is dedicated to $charityName, where there can be multiple GUIs each dedicated to a different payment proxy.

The landing page is generated by the payment service system to receive, e.g., collect, one or more payments on behalf of the recipient from one or more senders. The sender can access the landing page, e.g., by entering a URL into a web browsing application installed on the sender's client device. Upon navigating to the URL, the sender can simply enter a payment amount, e.g., in a web form field, and send the money, e.g., by selecting a "Pay" action button displayed on the website. In another example, the sender can access the landing page, e.g., by selecting a GUI within a mobile payment service application, where the GUI, e.g., is labeled with the payment proxy $aaron. The sender can further enter a payment amount at the GUI and send the money, e.g., by selecting a "Pay" action button displayed on the GUI.

The term "forum," as used here, refers to a media channel (e.g., a social networking website, a microblog, a blog, etc.) that enables user interaction and engagement through comments, posts, and/or messages. The forum can be employed by a service provider to provide various services to users of the forum, e.g., create messages, post comments, interact with one another, etc. Within a forum context, a user can indicate an intent to transfer money by specifying a payment proxy in a message that the user submits, e.g., "posts," on a particular forum, where that payment proxy carries the syntax of the monetary indicator preceding one or more alphanumeric characters. For example, the user posts a message "I support $funnyguy311 with $10." In such an example, the payment service systemdetects the user's intent to send money, e.g., $10, to "$funnyguy311" and initiates the transfer of money upon identification of a recipient financial account associated with "$funnyguy311." The monetary indicator can correspond to various currencies, e.g., dollar ($), euro (€), pound (£), yuan (¥), etc. Although use of the dollar monetary indicator ($) is used herein, it is to be understood that any currency symbol could equally be used.

The term "messaging application," as used here, refers to any messaging application that enables communication between users (e.g., sender and recipient of a message) over a wired or wireless communications network. A service provider that delivers a communication service to users, e.g., chat capability, can employ the messaging application. The messaging application can include, for example, a text messaging application for communication between phones (e.g., conventional mobile telephones or smartphones), or a cross-platform instant messaging application for smartphones and phones that use the Internet for communication. Within a messaging application context, a user can indicate an intent to transfer money by specifying a payment proxy in a TO field of, e.g., a message, that the user inputs within the messaging application. For example, the user enters into the TO field "$redcross." In another example, the user enters into the TO field "$aaron." Once the user enters a payment proxy, or input, into the TO field, the user can enter a message in a body of the message, e.g., "Here is $10," and send the message. In various embodiments, the message can be a text message, a chat message, an email message, or indeed any other type of message that is capable of being exchanged between computing devices. Although this specification may employ text messages as an example, it is to be understood that the payment proxy technology may employ any of these types of messages. Upon receiving an indication to send (e.g., after detecting that the user has clicked "Send"), the messaging application transmits a message, e.g., the text message to a messaging application computer system ("messaging application system"). The messaging application system detects that the input in the TO field of the message it has received includes a syntax of a monetary indicator preceding one or more alphanumeric characters. In response, the messaging application system forwards the text message to the payment service system for processing. The payment service system identifies a recipient associated with the input (or payment proxy) that is derived from the TO field, and further identifies a recipient financial account associated with that recipient. Upon identification of the recipient financial account, the payment service system initiates the transfer of money.

It is noted that the payment proxy technology is equally applicable in other embodiments to various other content providers and various other types of providers, such as financial service providers or to any application that involves communication of messages between users, and that the payment proxy technology is not limited to media channels and/or messaging applications.

The preceding summary is provided for the purposes of summarizing some exemplary embodiments to provide a basic understanding of aspects of the subject matter described herein. Accordingly, the above-described features are merely examples and should not be construed as limiting in any way. Other features, aspects, and advantages of the subject matter described herein will become apparent from the following description of Figures and Claims.

Turning now to the figures, FIG. 1 is a network diagram illustrating an environment 100 in which the friction-less purchasing technology can be implemented. The environment includes a merchant system 122 (e.g., e-commerce websites or web applications hosted on a web server(s) or application server(s) (not shown) that list the products and/or services offered by the merchant). The merchant system 122 can be connected to the inventory system, which updates the availability of products and services as incoming orders are placed. The merchant system 122 can be accessed by a customer using a client device 104 (e.g., a desktop computer, a laptop computer, a mobile device, a tablet or any other processing device) or a mobile device 102 of a customer. The mobile device 102 can be, for example, a smart phone, a tablet computer, a phablet, a notebook computer, or any other form of mobile processing device. In some embodiments, a mobile payment application 120 runs on the customer's mobile device 102. The mobile device 102 can also include other e-commerce applications ("requesting applications") 125 that are associated with one or more merchant systems and can be used by the customer to purchase products or services. The requesting applications 125 can also be websites, forums, URLs, application program interfaces (APIs), or any source website or application that either hosts a description of the product or service and/or provides an option to buy the product or service, irrespective of whether it is directly connected to the merchant system 122. The mobile payment application 120 can also be websites, forums, landing pages, application program interfaces (APIs), or any source website or application that provides a portal to send and accept payments for transactions. The requesting application 125 and the mobile payment application 120 can be accessed through a web browser (e.g., Chrome® or Safari®) on the mobile device 102, in one example. In another example, the requesting application 125 and the mobile payment application 120 can be software applications downloadable via an application store (e.g., Google Play Store). Once accessed or registered into the applications 125 and 120, the web browser remembers the credentials for subsequent customer visits (for example, through web browser authentication, web cookies, web history, etc.) allowing the customer to access the application without logging-in into an account. The description herein is with reference to the mobile payment application as an installed application; however it will be understood that the mobile payment application as an authenticated or unauthenticated application on a web browser is within the definition of the term.

The mobile device 102 also implements the auto-pay component 109, which may work in conjunction with the payment service 108. Additionally or alternatively, the auto-pay component 109 or an instance of the component is included within the payment service 108 as well. The auto-pay component 109 in configured to extract the payment information or location of mobile payment application accessed via a local database or a database within the payment service 108. In one example, the auto-pay component 109 extracts, parses and analyzes deep-links, direct links, or encrypted data packets to determine location of mobile payment application, whether the mobile payment application is authenticated in any web browser, the payment proxies associated with the merchant system, customer, and other parties of the transaction, and the transaction data (such as transaction summary, cost of items, tax amount, service or delivery fee, and so on).

The environment 100 can also include a computer system of the merchant's acquirer (hereinafter "acquirer 114"), a computer system of an issuing bank (hereinafter "issuer 118"), a computer system of a card payment network (hereinafter "card payment network 116"), and a computer system of a payment service (hereinafter "payment service system 108"), which can also implement the auto-pay component 109. Each of the aforementioned computer systems can include one or more distinct physical computers and/or other processing devices, which, in the case of multiple devices, can be connected to each other through one or more wired and/or wireless networks. All of the aforementioned devices are coupled to each other through a network 106, which can be, or include, the Internet and one or more wired or wireless networks (e.g., a Wi-Fi network, Bluetooth, Bluetooth Low Energy, and/or a cellular telecommunications network). In some cases, the mobile device 102 may be connected to the merchant system 122 on a network protocol (Bluetooth) different from the network protocol (Wi-Fi) between the merchant system 122 and the payment service system 108.

The environment 100, illustrated in FIG. 1, can accommodate transactions involving payment cards such as debit cards, credit cards, pre-paid cards, bank accounts, payment proxies, mobile payment applications and the like. The mobile payment application 120 can include an electronic wallet application, money transfer application (e.g., application for sending and receiving money via email or phone), or any other application having an account identifier (such as the payment proxy) that is linked to one or more payment cards and/or bank accounts and can be used by the owner of the mobile device to initiate transactions. Such transactions can include traditional purchase transactions between customers and merchants or service providers, person-to-person transactions and the like.

In the online purchase transaction, the customer accesses a requesting application to select items being sold by the merchant. At the checkout page, the customer is presented with a variety of payment options, e.g., credit card, debit card, gift card, a third-party website or application, etc. All of these options require the customer to enter payment information into the forms or in the case of a third-party website or application, require the customer to create an account and register the card with the third-party website, or log into the application with the login credentials if the customer is already registered. The existing options add a considerable delay and friction to the online shopping experience. To this end, in one implementation, one of the payment options is a payment field that the auto-pay system 109 automatically populates with the payment proxy 126 of the customer, for example in scenarios where the customer has either authenticated the web browser or the mobile device 102 itself. In some cases, the option and the payment field that gets auto-populated are different fields. The payment proxy 126 is connected to a financial account of the customer. The auto-pay component 109 stores the relationship between the payment proxy 126 and the financial account 128 in a local memory, web browser, or a registry in the mobile device 102, the merchant system 122, and/or at the payment service system 108. In some cases, the auto-pay component 109 provides a list of available payment proxies for the customer to select, for example, in a drop-down list.

In another implementation, a customer selects the mobile payment application 120 as the method of payment from among the available options. On selection, the auto-pay component 109 locates the location of the mobile payment application 120 and opens the interface of the mobile payment application 120 in a foreground while moving the requesting application 125 in the background. Alternatively, the mobile payment application 120 opens up in a pop-up window covering a portion of the screen occupied by the requesting application 125. The mobile payment application 120 is already connected to the financial account of the customer 128 at the time of installation or a previous visit. Alternatively, the customer can login once and will not be asked to re-login unless the customer logs out or deletes the application from the mobile device 102.

By using a payment proxy or a mobile payment application 120 connected to a payment card (e.g., debit or credit card) in a payment request, the merchant system 122 parses the payment proxy to obtain details of the payment card including the cardholder's name, payment card number, expiration date, card verification value (CVV)), billing address, etc., and provides such information to the payment service system 108 along with its own financial account information. In another case, the payment service system 108 parses the payment request to obtain the financial account information of both the merchant and the customer. The payment service system 108, in turn, processes the transaction by routing the authorization request to the acquirer 114. The acquirer 114 sends this data to the card payment network 116 (e.g., Visa, MasterCard), which forwards the data to the issuer 118 for authorization. If the transaction is approved or authorized by the issuer 118, a payment authorization message is sent from the issuer 118 to the merchant system 122 via a path opposite of that described above. Once the transaction is authorized, settlement and clearing occurs. During settlement and clearing, the issuer 118 sends the funds associated with the authorized transaction through the card payment network 116 to the acquirer 114 to be deposited in the merchant's account with the acquirer 114. In one implementation, the mobile device 102 transitions back to the requesting application 125 after the completion of the transaction.

Figure 2:
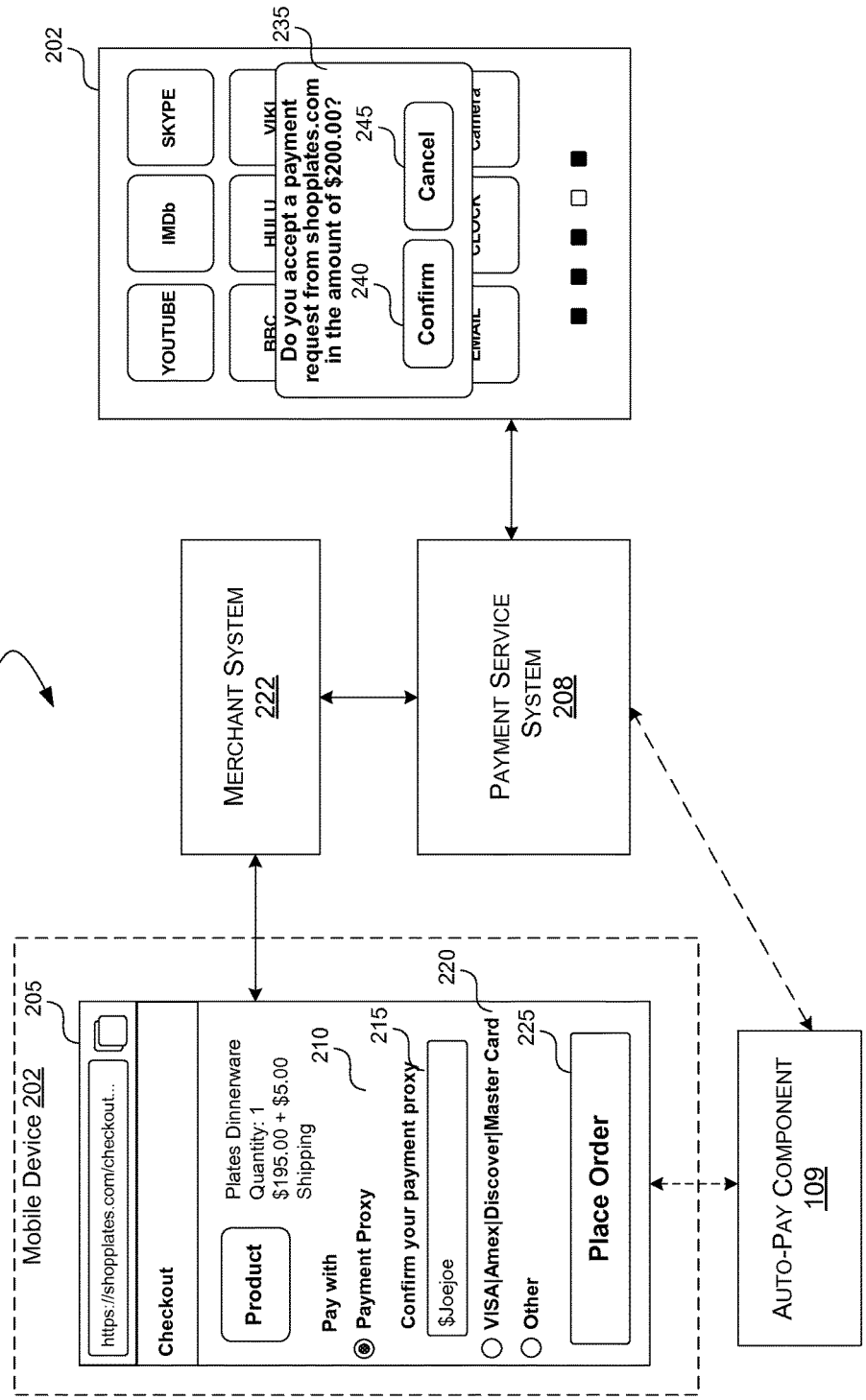
FIG. 2 is a block diagram illustrating an example purchase flow in accordance with an embodiment of the friction-less purchasing technology.

FIG. 2 is a block diagram illustrating an example purchase flow 200 in accordance with a first embodiment of the friction-less purchasing technology. The purchase flow 200 begins on a merchant's website or web application 205 (e.g., similar to requesting application 125) executing on the mobile device 202. When a customer is ready to purchase an item, the customer selects a "payment proxy" 210 as a payment method. The merchant's website 205 may include additional checkout options 220, such as a payment card (e.g., a debit or credit card such as VISA®, American Express®). When the payment proxy 210 is selected as the payment method, the customer is requested to enter a payment identifier 215, such as an email address, a phone number or payment proxy 210 as registered with the payment service system 208. Alternatively, an auto-pay component 209 automatically populates the payment field with customer's payment proxy 210. The auto-pay component 209 communicates with a local or remote memory unit to obtain such information. The payment proxy and its relationship with a financial account of the customer are stored in the mobile device 202, e.g., in a secure enclave. In some cases, such relationships may be stored in the payment service system 208 and only the payment proxy 210 is stored on the device 202. The auto-pay component 209 may fetch the payment proxy 210 if the web browser in which the web application 205 is accessed is authenticated or if the web-cookies are enabled, for example. The auto-pay component 209 can either be a component of the mobile device 202 or the payment service system 208 or even the merchant system 222. Alternatively, auto-pay component 209 is stored in the payment service system 208 or the mobile device 202 but with its instances or images in various devices, such as the mobile device 202. This is shown by dotted arrows out of the auto-pay component 209.

A customer then provides an input to submit the order by selecting the "Place Order" button 225. Alternatively, the button 210 can be the "Pay Order" button removing the need for an extra tap. In this example purchase flow, the customer can place the order using the payment proxy 210 without signing in or registering for an account with the merchant.

The details of the order submitted by the customer is received by the merchant system 222 which then sends a payment request to the payment service system 208 to initiate a payment transaction. The auto-pay component 209 of the payment service system 208 receives the payment request including the payment proxy 210 and optionally, order information (e.g., order identifier, product description and quantity, etc.). The auto-pay component 209 parses the payment request to extract the payment proxy 210 and uses the payment proxy 210 to look up or identify an associated payment card. The auto-pay component 209 can also use the payment proxy 210 to determine whether the customer associated with the payment card has a mobile payment application 209 installed on his or her mobile device 202. For example, if storage of a device identifier or a mobile application identifier in association with the payment proxy in one or more database tables can be an indication that the customer's has installed the mobile payment application on his or her mobile device. The mobile device identifier and/or the application identifier can be used by the auto-pay component 209 to send a push notification 235 to the customer's mobile device 202.

The push notification 235 can include information about the order and can request the customer confirm the order by selecting the confirm button 240 or cancel the order by selecting the cancel button 245. If the customer confirms the order, the payment service system 208 processes the payment request from the merchant system 222 by sending an authorization request to the issuer (e.g., issuer 118) of the payment card via the acquirer (e.g., acquirer 114) and the card payment network (e.g., card payment network 116). If the authorization request is approved, the auto-pay component 209 sends a success response to the merchant system 222 which then notifies the customer on its website 205 accordingly. In some embodiments, the auto-pay component 209 can also provide additional information such as a shipping address for the customer when sending the response to the merchant system 222 to facilitate physical delivery of purchased items to the customer. In the event that the customer cancels the payment request by selecting the cancel button 245 on the push notification user interface 235, the auto-pay component 209 a failed response to the merchant system 222, which then cancels the order and notifies the customer of the cancelation.

In some embodiments, the disclosed technology provides additional security in processing purchase transactions by implementing a two-factor verification method. For example, the website 205 can be accessed using a client device (e.g., client 104) that is separate from the mobile device 202. The confirmation on the mobile device 202 can thus act as a second verification factor, while the payment proxy of the customer acts as a first verification factor. In other embodiments, the website 205 can be accessed on a mobile web browser of the same mobile device 202 to which the push notification is delivered. In one implementation, operationally and structurally, the merchant system 122 is similar to merchant system 222; payment service system 108 is similar to payment service system 208; mobile device 102 is similar to mobile device 202; and auto-pay component 109 is similar to auto-pay component 209.

FIG. 3 is a block diagram illustrating an example purchase flow 300 in accordance with a second embodiment of the friction-less purchasing technology. The purchase flow 300 begins on a website or a web application 305 (e.g., display component for displaying information identifying one or more items) executing on mobile device 302. In this example purchase flow, the customer can submit the order without registering for or signing in to an account (e.g., with the merchant system or any other service that processes payments for the merchant system) and thereby avoid a need to use an authentication procedure associated with accessing the account to complete the purchase transaction. For example, when a customer is ready to checkout, he or she can select the payment proxy 310 as the payment method. When the customer selects the payment proxy 310 payment method, the customer is requested to enter a payment identifier 315, such as a payment proxy of the customer, an email address or a phone number and a card verification value 320 associated with a payment card linked to the communication identifier into the user interface elements. Alternatively, as shown, the auto-pay component 309 populates the payment proxy 315 with the customer's payment proxy based on or when, for example, the web browser is authenticated, the billing address or payment name is entered, or a certain shopping behavior or item is detected. The customer can then submit the order by selecting the "Place Order" button 325, or in another embodiment, by selecting the payment proxy 310 button alone. In response to the customer selecting the button 325 using a single action (e.g., a single tap, a single click, a single gesture), a purchase order submission component can gather at least some of the information identifying the items in the order (e.g., item ID or stock keeping unit), the payment proxy 315 and the card verification value to generate a request and transmits the request to the merchant system 322. In some embodiments, other information associated with the payment card such as a portion of the payment card number (e.g., primary account number or PAN) can be requested on a registered email address or phone number instead of or in addition to the card verification value.

The order submitted by the customer is received at the merchant system 322, which then sends a payment request to the payment service system 308 to request payment for the transaction initiated by the customer. The payment service system 308 receives the payment request and uses the payment proxy 315 and optionally, a verification value, e.g., the card verification value, included in the payment request to identify the payment proxy that is to be used to pay for the transaction. The payment service system 308 then sends an authorization request to the issuer (e.g., issuer 118) of the payment card via the acquirer (e.g., acquirer 114) and the card payment network (e.g., card payment network 116). If the authorization request is approved, the auto-pay component 309 sends a success response to the merchant system 322 which then notifies the customer on its website 330 accordingly. For example, the auto-pay component 309 locates the communication identifier, e.g., email address or phone number, registered with the payment proxy 315 and delivers the notification to that communication identifier.

In one implementation, operationally and structurally, the merchant system 122 is similar to merchant system 322; payment service system 108 is similar to payment service system 308; mobile device 102 is similar to mobile device 302; and auto-pay component 109 is similar to auto-pay component 309.

Figure 4A:
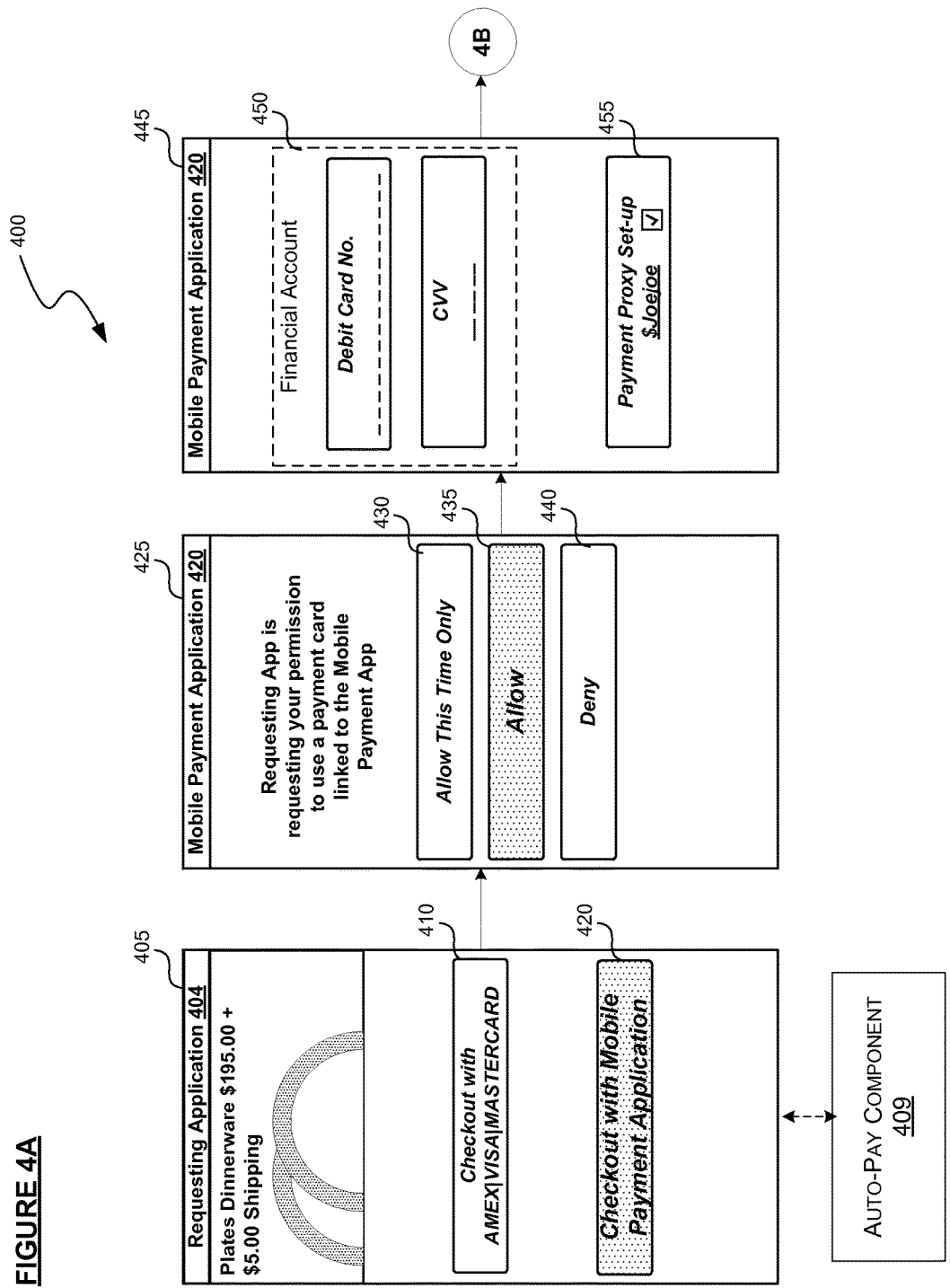
FIGS. 4A and 4B are block diagrams illustrating an example purchase flow in accordance with an embodiment of the friction-less purchasing technology.
Figure 4B:
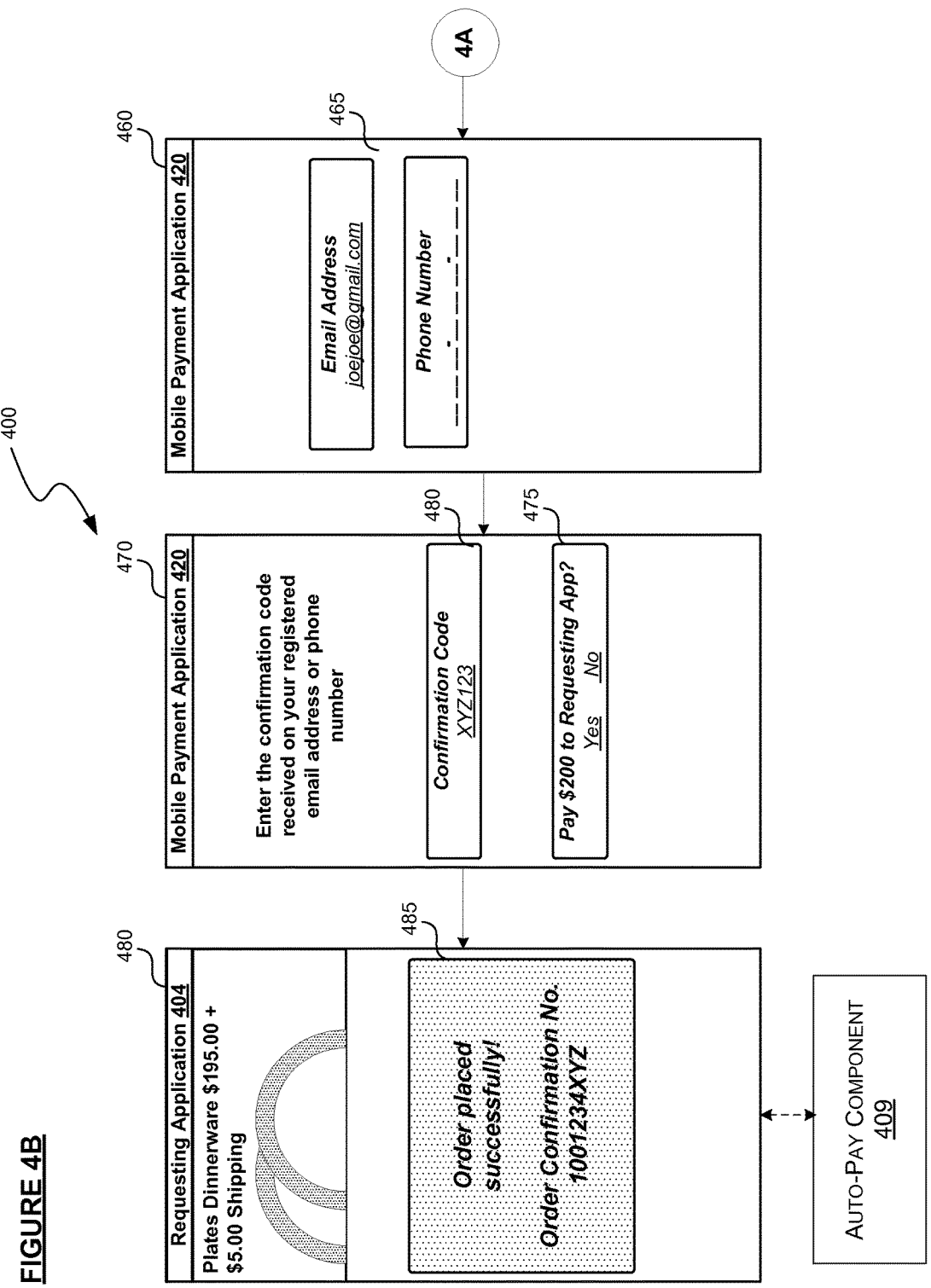

FIGS. 4A and 4B are block diagrams illustrating an example purchase flow 400 in accordance with a third embodiment of the friction-less purchasing technology. The purchase flow 400 begins on the requesting mobile application 404 (similar to requesting mobile application 125) on the mobile device 402. The requesting application 404 can be a browser application that can be used to access a website or a web application or a mobile e-commerce application installed on the mobile device. When a customer is ready to checkout, the customer selects one of the payment methods, e.g., 410 or 420, displayed on a user interface 405 of the requesting mobile application 404. When the customer selects the payment method 420 to pay for the transaction using the mobile payment application, the auto-pay component 409 takes control and parses the payment method 420 (or a hyperlink embedded therein) to locate and invoke an installed mobile payment application 420. An example of the hyperlink under payment method 420 is a deep-link substantially in the format:

mobilepaymentapplication.me://mobilepaymentapplication.me/checkout//platesUS/$200.

Thus, in one example, the deep-link has the format: <section 1> <section 2> <section 3> <section 4>, where section 1 indicates the location of the mobile payment application as it is installed on the device (in which the customer is either logged in or is logged out but a sign-in page is opened) or in a web browser (authenticated or otherwise); section 2 indicates the specific page or interface within the mobile payment application; section 3 indicates the payment proxy of the merchant or recipient (e.g., $platesUS); and section 4 indicates the money owed to the merchant by the customer. In case the application 420 is not installed, the link takes the control to an application store to allow the customer to download the mobile payment application 404 on the device. In one implementation, the auto-pay component 409 both generates and parses the deep-link in real-time as the selection of the payment option is received.

The auto-pay component 409 opens the mobile payment application 420 by moving the requesting application 404 in the background and moving the mobile payment application in the foreground. In another case, the auto-pay component 409 opens the mobile payment application 420 in a window such that the user interface 425 of the mobile payment application 420 covers a portion of the interface 405 of the requesting application 404. To a first time user, the user interface 425 of the mobile payment application 420 may display a request from the requesting application 404 for permission to use a payment card or financial account linked to the mobile payment application 420. The customer can select option 430 to grant the requesting application 404 a one-time permission to use the mobile payment application 420 to make a request for payment. The option 435 can be selected to grant the requesting application 404 a permission (e.g., perpetual or long term) to make payment requests to the mobile payment application 420, after which the customer is not presented with the interface in subsequent interactions. The "Deny" option 440 can be selected to deny the requesting application from using the mobile payment application to request payments.

In the purchase flow 400, when the customer grants the requesting application 404 permission to make payment requests to the mobile application 420 by selecting option 430 or 435, the customer, specifically a first time user that is not registered with the mobile payment application 420 enters financial account information 450, e.g., debit card number, credit card number, or bank account number in the user interface 445. In some embodiments, the mobile payment application 420 can request the customer to provide a card verification value (CVV) of the payment card or a routing number, in case of a bank account, for an extra layer of security. The customer may optionally create a payment proxy 455 at this time for ease in processing subsequent transactions, and avoid entering the payment information each time. The payment proxy 455 can be saved locally in the device and/or with the payment service system 108 connected to the mobile payment application 420. If the payment proxy is not available or is registered with some other user, the application 420 provides suggestions for the user to pick.

In some embodiments, the customer can configure preference settings for each requesting application to define the conditions or rules under which payment requests from the requesting application can be processed. For example, by setting an amount threshold, the customer can authorize the mobile payment application to process payment requests from the requesting application that are in the amount $300.00 or less, without prompting the customer for confirmation. For payment requests higher than the threshold amount, the mobile payment application can request a verification action (e.g., entry of a card verification value) from the customer or a confirmation that the customer wishes to proceed with the transaction. The preference settings may also include an option to turn on/off notifications when a payment request is processed. In some embodiments, a default setting can be specified by the mobile payment application for processing payment requests. For example, by default in the absence of preference settings, all payment requests can cause the mobile payment application to notify the customer to obtain confirmation from the customer to proceed with the transaction. These setting options are exemplary and several other setting options may be available for each requesting application that uses the mobile payment application as a payment method.

In some implementations, as shown in user interface 460, the mobile payment application 420 can request for additional authentication by asking the customer to provide a communication identifier 465, e.g., an email address or a phone number at which the mobile payment application 420 or the auto-payment component automatically sends a confirmation code on the email address or phone number used at the time of installation of the mobile payment application 420.

As shown in user interface 470 of FIG. 4B, the customer enters the unique confirmation code 480 received at the registered email address or phone number, which the mobile payment application 420 compares with the sent value of confirmation code 480. Additionally, the application 420 requests confirmation on whether the customer agrees to the payment of an amount owed to the merchant. The auto-pay component 409 sends information related to the transaction 475 (e.g., payment amount, transaction details, etc.) to the mobile payment application 420, for example through the parsing of the deep-link. The deep-link can then be substantially of the format:

mobilepaymentapplication.me://mobilepaymentapplication.me/platesUS/$200.

On detecting various sections, the auto-pay component 409 renders values in each of the fields of the mobile payment application from the identified sections. For example, the auto-apy component 409 enters value '$200' in the pay '_____' to 'requesting app.'

In response to a match of confirmation codes, the mobile payment application 420 sends a payment request to the payment service system (e.g., payment service system 108) on behalf of the requesting application 404 to initiate the payment transaction. The payment request can include the payment proxy corresponding to the mobile payment application, an identifier corresponding to the mobile device or a combination thereof, which can be used by the payment service system to identify the payment card that is to be used to pay for the transaction. In some embodiments, the payment request can be a HyperText Transfer Protocol (HTTP) request. In other embodiments, the payment request can be an email message or a text message. The auto-pay component 409 receives the notification of successful payment (along with order summary and order confirmation number) and forwards it to the requesting application 405 in the user interface 485. Thus, the mobile payment application 420 moves to the background and the requesting application 404 comes in the foreground. In some cases, the mobile payment application 420 may also publish such a notification indicating status of transaction 485, contemporaneously. The mobile payment application 420 can send back the notification (having order confirmation number) to the requesting application 404 via another deep link or through some other channel. The requesting application 404 then parses the deep-link, for example, using the auto-pay component 409 to obtain data relevant to its interface where confirmation is displayed. In another implementation, the mobile payment application 420 can be requested to land on a web page or web application different from the requesting application 404 in the same or different browser, for example, as per customer preferences. In one implementation, operationally and structurally, the merchant system 422 is similar to merchant system 122; payment service system 408 is similar to payment service system 108; mobile device 402 is similar to mobile device 102; and auto-pay component 109 is similar to auto-pay component 409.

Figure 5A:
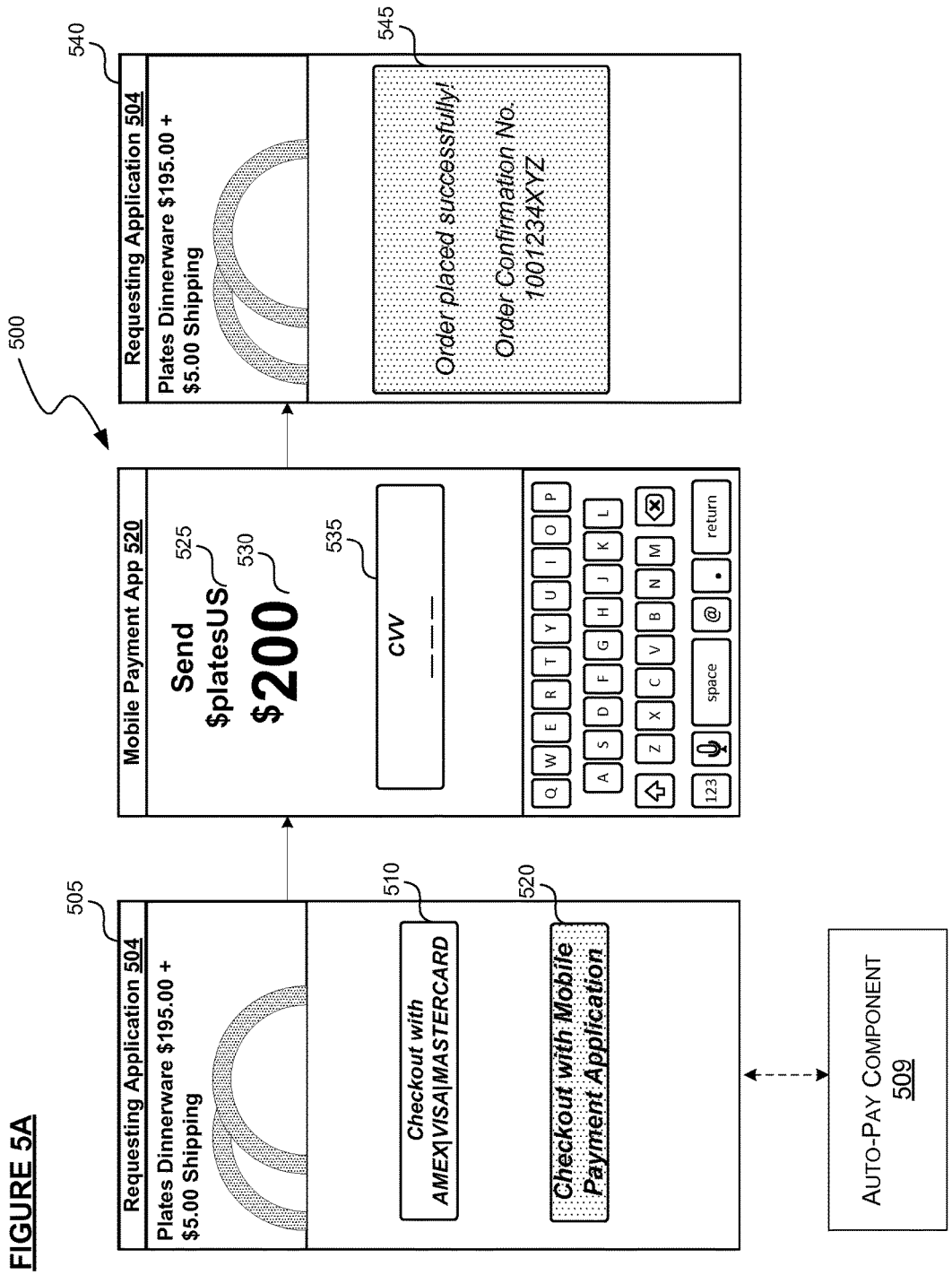
FIGS. 5A and 5B are block diagrams that illustrate example purchase flows in an embodiment of the friction-less purchasing system.
Figure 5B:
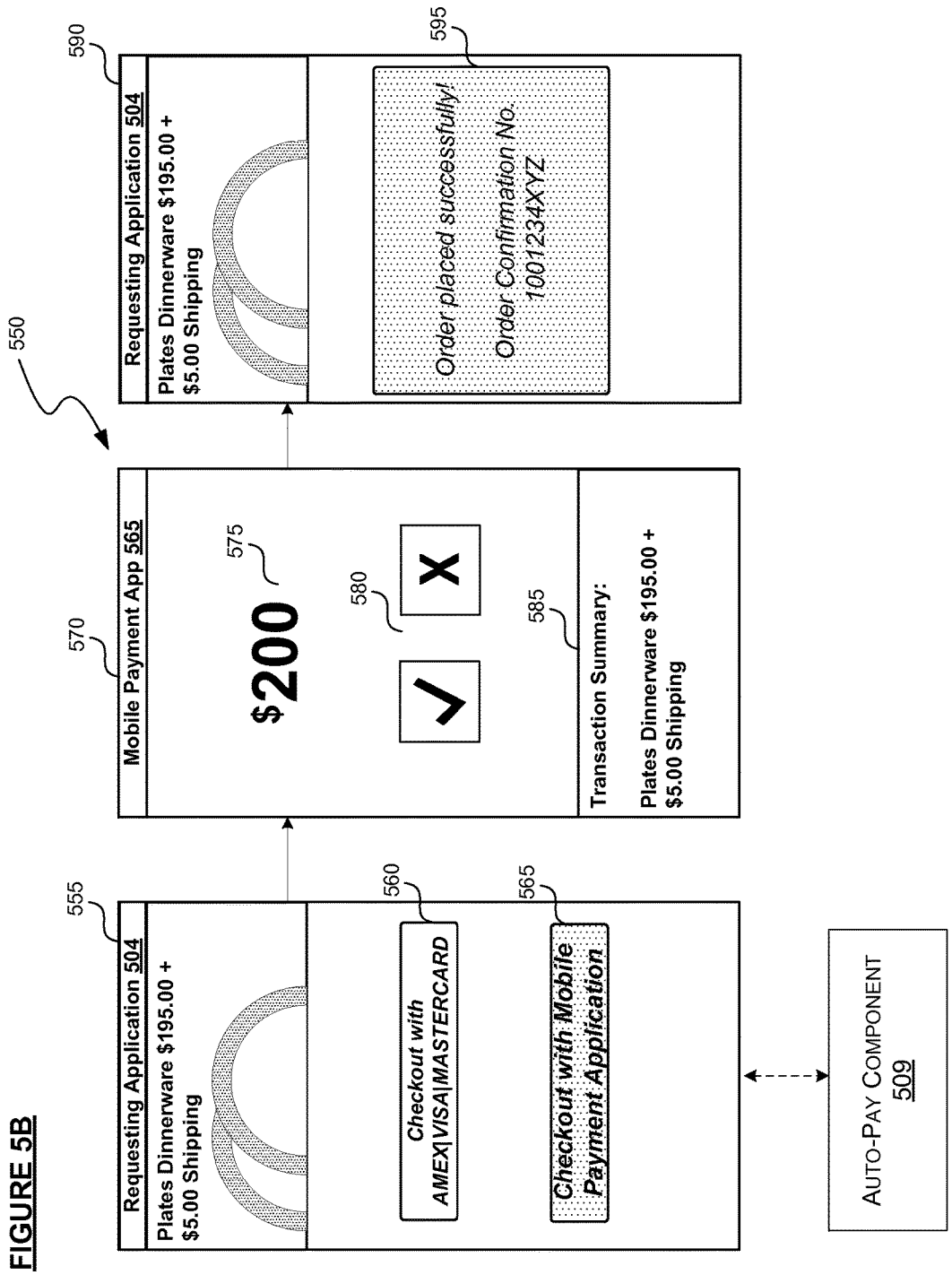

FIGS. 5A and 5B are block diagrams that illustrate example purchase flows 500 and 550 in a fourth embodiment of the friction-less purchasing system. The purchase flow 500 begins on the user interface 505 of a requesting application 504, which displays multiple payment methods, e.g., 510 and 520. When the customer selects the "Checkout with Mobile Payment Application" option or button 520, the auto-pay component 509 locates and invokes the mobile payment application 520 if it is installed on the mobile device, and/or authenticated by the web browser displaying the requesting application 504. It will be understood that in some cases, a payment service 108 is invoked as soon as the mobile payment application 520, whereas in some cases, the payment service 108 is not invoked until the payment request is submitted for processing. The customer can enter an amount 530 corresponding to the purchase on the user interface 505, or alternately, the payment amount can be auto-populated based on order information received from the requesting application. For example, the auto-pay component 509 obtains the payment amount and sends it to the mobile payment application 520 within a navigable link, e.g., a direct hyperlink or deep-link. The auto-pay component 509 also sends the financial account information of the merchant or a payment proxy 525 associated with the requesting application 504 (e.g., $platesUS). The auto-pay component 509 may derive this information from the payment service system using an identifier of the merchant, e.g., merchant name, business URL, etc. Additionally or alternatively, the payment proxy of the merchant 525 may be embedded in the URL or a source code of the requesting application 504. The auto-pay component 509 parses the source code or the URL to identify the syntax of payment proxy. The customer can be asked to enter a CVV 535 for additional security or verification.

Once confirmed, the mobile payment application 520 initiates transfer of the payment amount from a payment account associated with the customer's payment proxy to a financial account associated with the requesting application's payment proxy. In some embodiments, when the auto-pay component 509 authorizes and invokes the mobile payment application 520 to request the payment amount, the mobile payment application 520 displays a notification message to provide confirmation to proceed with the transaction. Upon receiving confirmation from the customer, the mobile payment application 520 processes the transaction and generates message 545 of successful transfer on the requesting application 504, thus moving the transition back to the requesting application 504, as shown in the user interface 540. In one implementation, operationally and structurally, the auto-pay component 509 is similar to auto-pay component 109.

If the mobile payment application is not authenticated in a browser or installed on the device 102, the customer is asked to re-enter or furnish such information as necessary to process the transaction.

FIG. 5B illustrates an example purchase flows 550 in an embodiment of the friction-less purchasing system. The purchase flow 550 begins on the user interface 555 of a requesting application 504, which displays multiple payment methods, e.g., 560 and 565. When the customer selects the "Checkout with Mobile Payment Application" option 565, the auto-pay component 509 invokes the mobile payment application 565 if it is installed on the mobile device. The auto-pay component 509 obtains the payment amount and sends it to the mobile payment application 520 within the deep-link, as shown in user interface 570. The auto-pay component 509 also sends the financial account information of the recipient or a payment proxy associated with the requesting application 504 (e.g., $platesUS), a payment proxy associated with the customer, along with other details, such as the order number and/or order summary. The customer is optionally asked to confirm or reject (through options 580) the amount 575, transaction summary 585, and payment proxy, all of which the customer can change.

On receiving the confirmation, the mobile payment application 520 initiates transfer of the payment amount from a payment account associated with the customer's payment proxy (which is stored or associated with the mobile payment application 520) to a financial account associated with the requesting application's payment proxy. The mobile payment application 520 communicates with the auto-pay component 509 to determine the financial account information, which is either stored locally or at a remote location, such as within the payment service system 108. The mobile payment application 520 or the auto-pay component 509 processes the transaction through the payment service system 108 and generates message 595 of successful transfer on the requesting application 504, thus moving the transition back to the requesting application 504, as shown in the user interface 590.

As described herein, the transaction time is substantially reduced (less than 10 seconds) and the customer taps only once (if the step for confirmation is included) or twice (if the step of CVV is requested) to finish the transaction. This not just simplifies the transaction processing but also improves the consumer shopping experience considerably. The mobile payment application 520 can be connected to any requesting application 504 as the auto-pay component 509 and the associated deep-link is updated accordingly to reflect the dynamic nature of order history and the requesting application's payment proxy. In one implementation, operationally and structurally, the auto-pay component 509 is similar to auto-pay component 109.

It will be understood that in FIGS. 2-5 the mobile payment application is an API, however, the mobile payment application can be a landing page customized for the customer. For example, it can be in the format: www.mobilepaymentapplication.com/joejoe. In another example, it can be an extension of the requesting application, thus, it can be www.requestingapplication.com/joejoe.

Figure 6A:
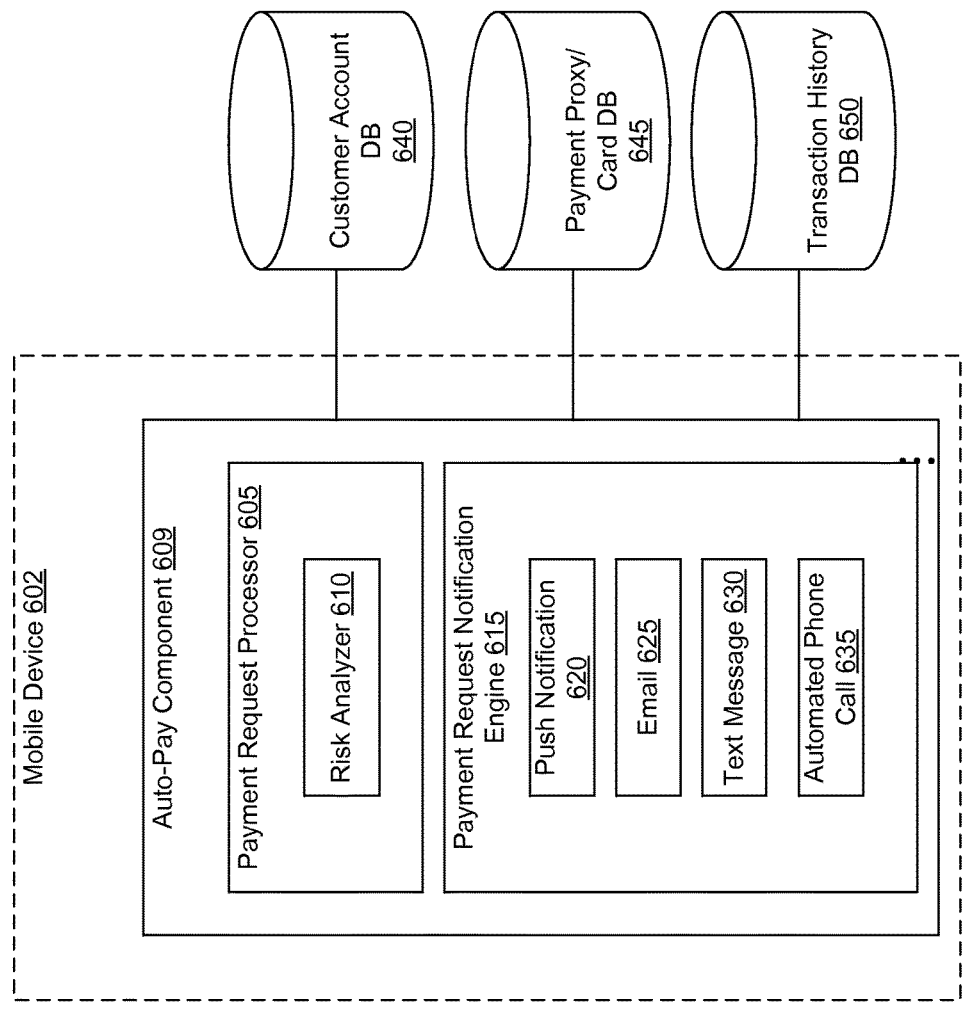
FIG. 6A is a block diagram that illustrates an example of components of the mobile device in accordance with some embodiments of the friction-less purchasing technology.

FIG. 6A is a block diagram that illustrates an example of components of the mobile device in accordance with some embodiments of the friction-less purchasing technology. Even though the auto-pay component 609 is shown to be a component or a sub-system of the mobile device 602; it can also be a component or a sub-system of the payment service system (e.g., payment service system 108). Alternatively and additionally, the auto-pay component 609 can be implemented on a separate computing system (e.g., on a separate server or server(s)) and can be an instance of the application or component residing elsewhere, e.g., in the payment service system 108. The auto-pay component 609 can include a payment request processor 605 and a payment request notification engine 615, among others, in some embodiments, for example separate from the mobile device's processor and memory, such as a secure enclave arrangement. The auto-pay component 609 can access one or more database tables such as the customer account database table 640, payment card database table 645 and/or transaction history database table 650 to retrieve and/or store data. The customer account database table 640 can store various fields of information such as a customer identifier, name, email address, phone number, device identifier, mobile application identifier, billing address, shipping address, and/or the like. The payment card database table 645 can include various fields of information such as a customer identifier, payment card/account number (e.g., primary account number or PAN), expiration date, card/account type, and/or the like. Additionally, the payment card database table 645 includes payment proxy of the customer, payment proxy of the merchant, and a relationship between the financial account of the customer with the payment proxy of the customer. The transaction history database table 650 can include various fields of information such as a transaction identifier, customer identifier, date, merchant name, amount, product/service item names/codes, and/or the like. Various other database tables may also be accessed by the auto-pay component 109.

The payment request processor 605 can process payment requests from merchant systems as described in detail with respect to FIGS. 2-5. For example, the payment request processor 605 can receive payment requests from merchant systems, parse the payment requests to extract details such as the payment proxy, the security code for a payment card, order information, or the like. The payment request processor 605 can check whether a payment proxy is associated with one or more payment cards and can process payment requests when triggered by a verification action by initiating a transfer of an amount associated with the payment request from a bank account funding one of the payment cards to a financial account associated with the merchant system.

In some embodiments, the risk analyzer 610 can examine incoming payment requests for any indications for fraud and evaluate a level of risk associated with processing the payment requests. Based on the level of risk, the payment request processor 605 can determine whether to block the payment request or to allow the payment request to be processed. The risk analyzer 610 can determine or assess a level of risk associated with a payment request by analyzing attributes of the payment request and historical data (e.g., past transactions associated with the a customer) to identify one or more risk factors. The historical data associated with past transactions can be stored in a database table 650. Examples of risk factors can include, but are not limited to: pattern of purchase behavior, transaction amount, volume, frequency and/or timing of payment requests, identity of the merchant, and/or the like. Each of the risk factors can be scored and/or weighted to determine an aggregate risk score that provides an assessment of the level of risk associated with a payment request. When the aggregate risk score is higher than a threshold, indicating a higher likelihood of fraud, the risk analyzer can, for example, notify the trigger payment request processor 605 and/or the payment request notification engine 615 so that the payment request can be blocked from reaching the customer and can be canceled.

In some embodiments, customers can have mobile payment applications installed on their mobile devices. Alternatively and additionally, the mobile payment applications may be connected to requesting applications. Payment requests associated with those customers can cause the payment request notification engine 615 to receive push notifications from payment service using the push notification component 620, and send to the requesting or mobile payment applications. In general, a push notification for a payment request is generated based on information included in the payment request, and can prompt the customer to confirm or cancel the payment request. Based on the customer's response, the payment service system can process the payment request by initiating transfer of an amount of funds corresponding to the payment request from a bank account associated with the payment card to a financial account associated with the merchant system. In some embodiments, when a payment request is determined to have a level of risk higher than a threshold, the payment request notification engine 615 can block a push notification for the payment request from being sent to the customer's mobile device.

Some customers may not have the mobile payment application installed on their mobile devices. The payment request notification engine 615, in this instance, can send a notification in the form of an email 625, text message 630 and/or an automated phone call 635 to request a customer to confirm or cancel a payment request. For example, the customer can confirm the payment request by providing a card verification value associated with a payment card or send another confirmatory response. In some embodiments, the notification engine 615 can select a notification method for requesting verification or confirmation from a customer based on the level of risk associated with the payment request. For example, if the level of risk is high, the notification engine 615 can use the automated phone call option. Similarly, if the level of risk is low, the notification engine can use the push notification option.

Figure 6B:
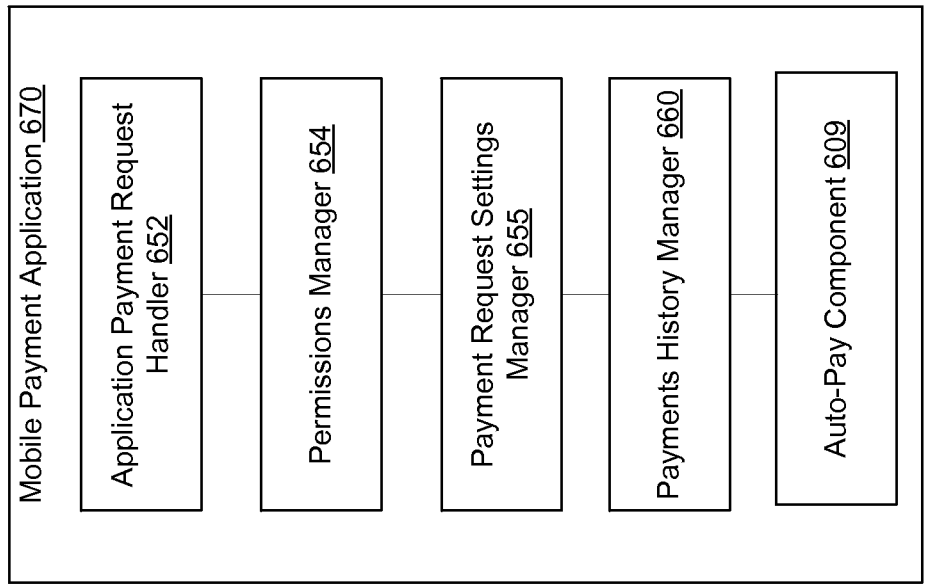
FIG. 6B is a block diagram that illustrates an example of components of the mobile payment application on a mobile device in some embodiments of the friction-less purchasing technology.

FIG. 6B is a block diagram that illustrates an example of components of the mobile payment application 670 on a mobile device in some embodiments of the friction-less payment technology. The mobile payment application 670 can include an application payment request handler 652, a permissions manager 654, a payment request settings manager 655, a payments history manager 660, and an auto-pay component 609, among others in some embodiments. In some cases, some or all components of the mobile payment application 670 may reside in a payment service system 108. For example, the auto-pay component 609 may reside in the payment service system 108, and can be similar to auto-pay component 109 both structurally and operationally.

The auto-pay component 609 receives a selection from the customer on a payment field, in response to which it sends a detected deep-link to the payment service system 108. On authorization from the payment service system 108, the auto-pay component 609 and/or the application payment request handler 652 receive payment requests from requesting applications on the mobile device and process the payment requests based on permissions managed by the permissions manager 654. In one example, the payment request includes information parsed from a direct hyperlink or a 'deep-link," information including payment proxy of the customer, location of the mobile payment application, a URL of the mobile payment application, the payment proxy of the merchant associated with a requesting application, amount owed to the merchant, and the like. Deep links provide a direct path to specific information in a Web application requested by the user, instead of requiring the user to navigate to the home page and drill down to reach the same information. One example of a deep link is a hyperlink in one Web application that points to a specific page in a different Web application (e.g., http://mobilepaymentapplication.com/Joejoe), instead of pointing to the default home page of the different Web application (http://mobilepaymentapplication.com). Another example of a deep link is a hyperlink in one Web application that points to a specific page in a different Web application and also includes context data which the different Web application can use as a basis for retrieving information from its associated database and present that information to the user. Accordingly, the auto-payment component 609 creates interfaces to confirm or process the payment request via the mobile payment application 670.

The permissions manager 654 can track permissions granted by a customer to various requesting applications to make payment requests via the mobile payment application. Those requesting applications that have been permissioned by the customer to request payment via the mobile payment application can send payment requests to the mobile payment application in the background. For example, when the application payment request handler 652 receives an incoming payment request from a requesting application, the payment request handler checks with the permissions manager 654 to determine whether the requesting application is allowed to make the payment request. If the requesting application has a valid permission, then the application payment request handler 652 handles the payment request by sending it on to the payment service system. If, for example, the requesting application does not have a valid permission, the application payment request handler 652 can decline to process the payment request or notify the customer for confirmation.

The payment request settings manager 655, in some embodiments, can receive and store preference settings specified by the customer for handling payment requests by the application payment request handler 652. For example, the application payment request handler 652 can check with the settings manager to determine whether a payment request from a requesting application meets all the rules set up by the customer (e.g., payment amount threshold) and process the payment request when the payment request meets the conditions associated with the rules. The payment history manager 660, in some embodiments, can track and store a history of payment requests from each requesting application handled by the mobile payment application.

Figure 7A:
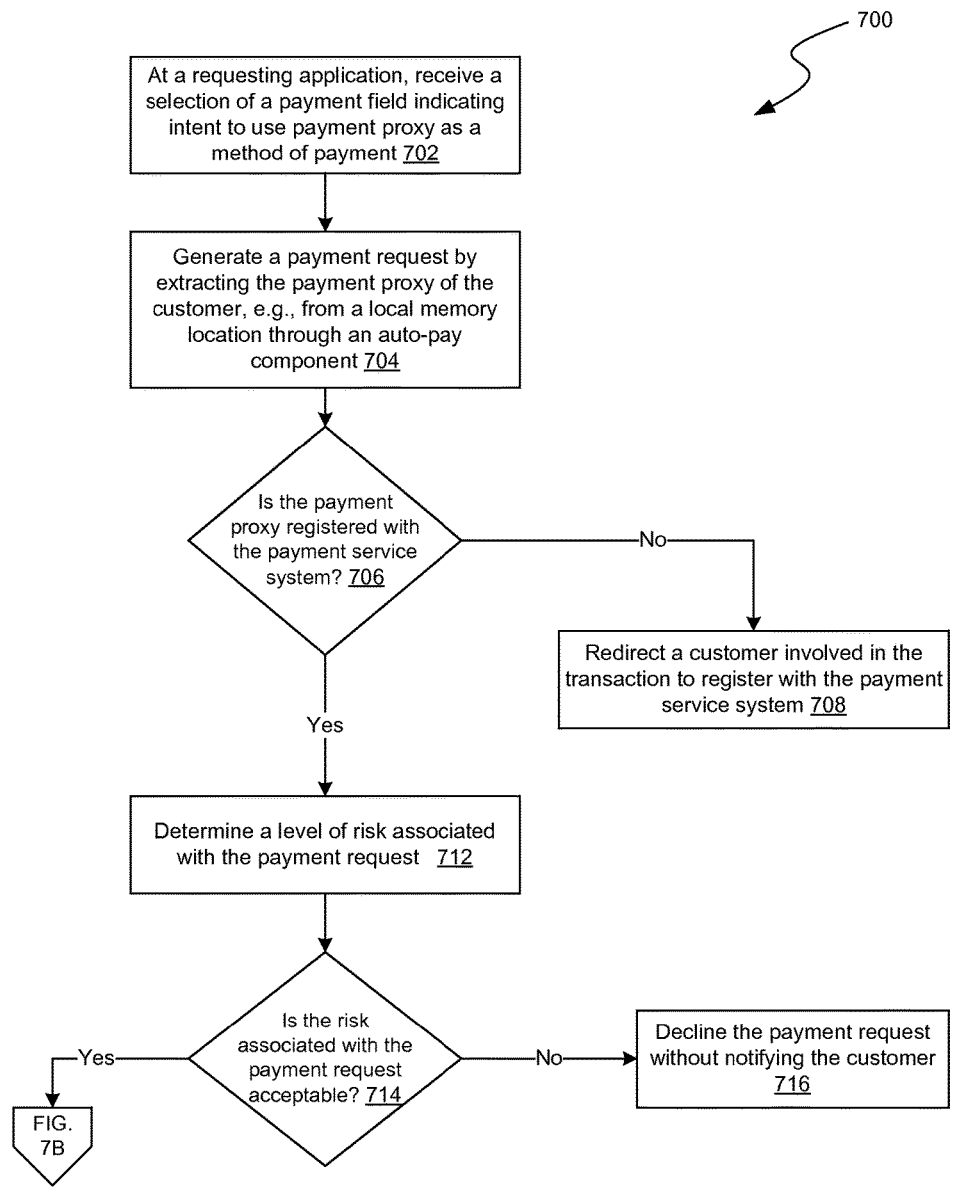
FIGS. 7A-7B illustrate an example method of processing a payment request in accordance with an embodiment of the friction-less purchasing technology.
Figure 7B:
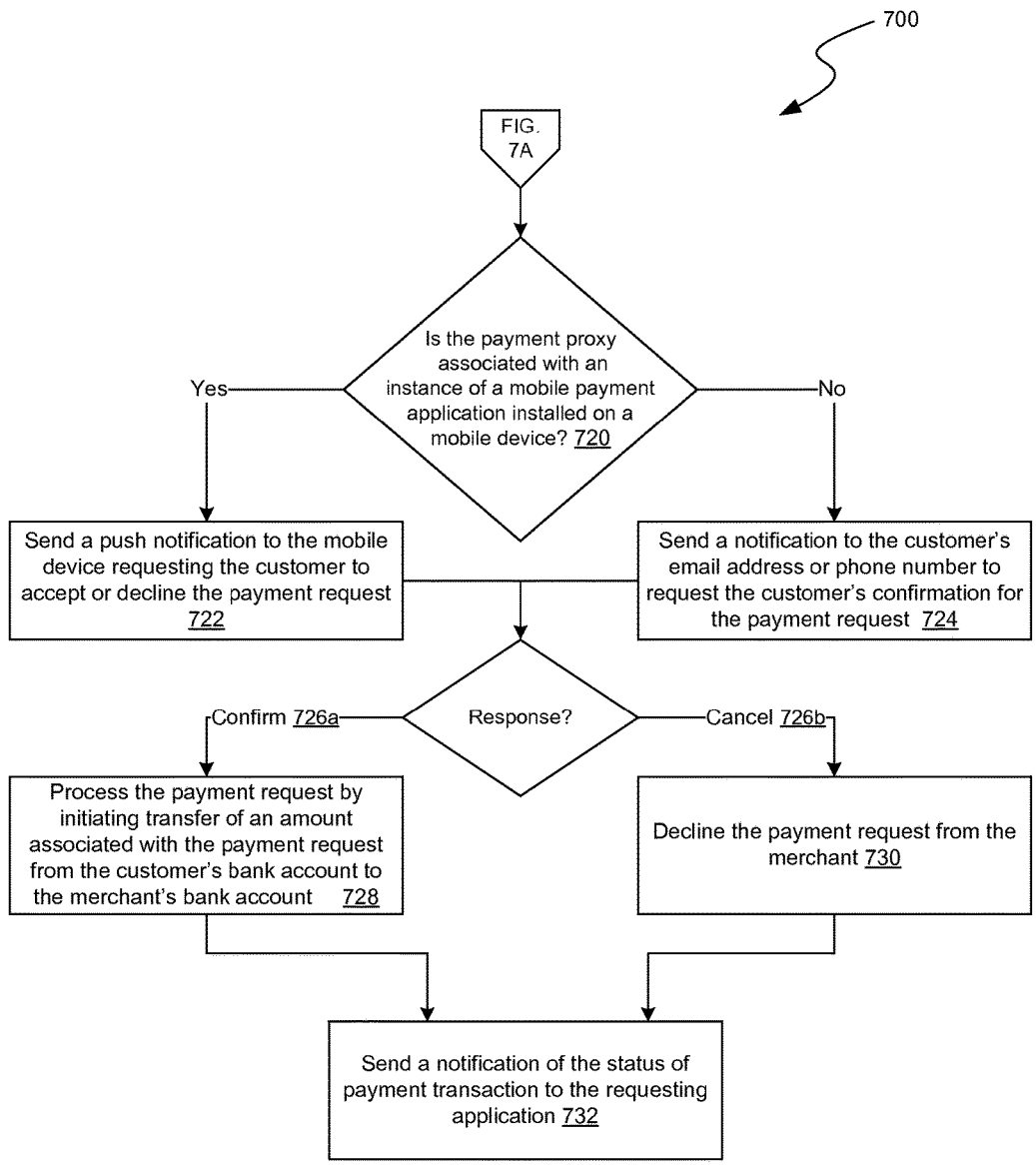

FIGS. 7A-7B illustrate an example method(s) of processing a payment request in accordance with a first embodiment of the friction-less purchasing technology. In this embodiment, the disclosed technology receives a payment request including a payment proxy for a merchant system and the customer, analyzes the payment request to assess a level of risk associated with it and based on the level of risk, determines whether to send a push notification to a mobile device associated with the payment proxy to request confirmation on the payment request.

Referring to FIG. 7A, at block 702, the auto-pay component (e.g., auto-pay component 109) receives an indication that a customer intends to use payment proxy as a method of payment for a purchase transaction, for example by receiving a selection of a payment field or button on the interface of the requesting application. On clicking the option, the auto-pay component fetches a payment proxy associated with the customer (and optionally, the merchant) and populates an associated payment field with the retrieved value of payment proxy, without having the user to fill the field himself or herself. The auto-pay component may do so by accessing a local memory store or by pinging the payment service system 108. The auto-pay component can ask the user to confirm the auto-fill entry of the payment proxy. The auto-pay component also creates a payment request on behalf of the merchant, where the payment request associated with a purchase transaction from a merchant system at block 704. At decision block 706, the auto-pay component generates a payment request for a payment service, which then determines if the identifier is associated with a payment card in the payment service system. If the identifier is not associated with a payment card, the auto-pay component can send a notification (e.g., an email or a text message) to the requesting application or on a communication identifier on record in the payment service system 108, asking the customer to register with the payment service system by associating a payment card to the identifier at block 708. The payment request can be in the form of a mobile deep-link, hyperlink, or an encrypted or tokenized data packet.

In some embodiments, if the identifier is associated with a payment card, the auto-pay component can examine the customer's transaction history and attributes of the payment request to determine a level of risk (or a risk score) associated with the payment request at block 712. For example, if the customer's transaction history indicates a history of purchase of clothing for male and the order is associated with a clothing for female, the change in purchase behavior can be an indication of fraud, which is considered in assessing the level of risk. Similarly, a payment request for an amount much larger than in the past can be another indication of fraud that can be considered in determining the level of risk. At decision block 714, if the level of risk associated with the payment request is acceptable or under a pre-defined threshold, the payment request is highly likely to be fraudulent and so in that instance, the auto-pay component can decline the payment request without notifying the customer at block 716.

Referring to FIG. 7B, if the level of risk associated with the payment request is determined to be acceptable or above a predefined threshold, the auto-pay component can submit the payment request to a payment service system that fulfills the payment transaction by transferring funds from a financial account of the customer (tied to customer's payment proxy) to a financial account of the merchant (tied to the merchant's payment proxy). Alternatively, the auto-pay component can determine (e.g., in a deep-link of the payment field) if the payment proxy included in the payment request is associated with an instance of a mobile payment application installed on a mobile device at decision block 720. If so, the auto-pay component can retrieve a device identifier associated with the mobile device and send a push notification to the mobile device to request the customer to confirm or cancel the payment request. If the identifier is not associated with an instance of the mobile payment application, the auto-pay component can send a notification to the customer's email address or phone number to request the customer to confirm or cancel the payment request at block 724. If a "confirm" response 726a is received from the customer, the payment service system processes the payment request at block 728. If a "cancel" response 726b is received from the customer, the payment service system declines the payment request from the merchant system at block 730. Accordingly, a 'success' or 'denial' message is sent to the customer on the mobile device, e.g., on the interface of the requesting application or mobile payment application, or a separate web page in a different or same web browser.

Figure 8:
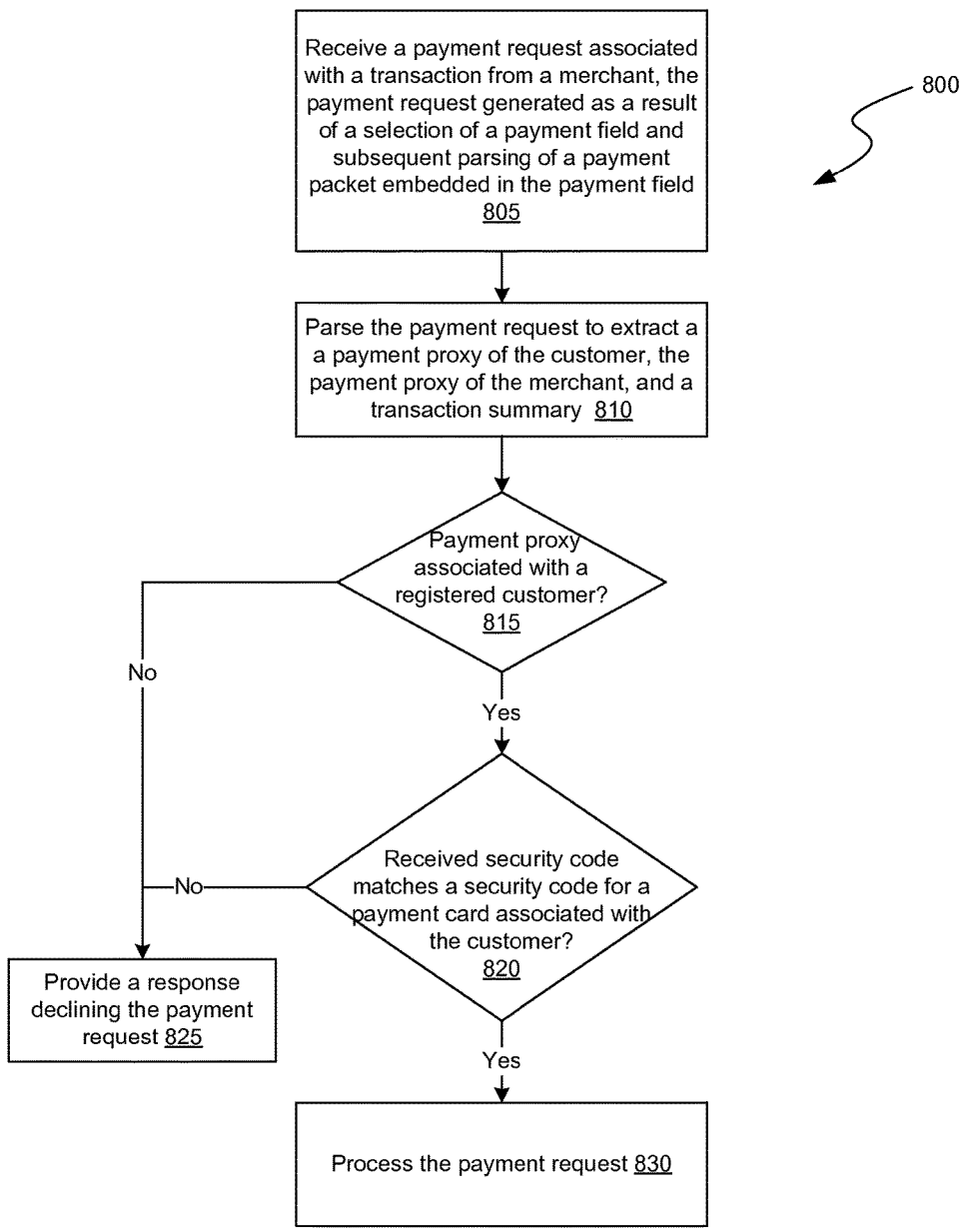
FIG. 8 is a flowchart that illustrates an example method of processing a payment request in accordance with an embodiment of the friction-less purchasing technology.

FIG. 8 is a flowchart that illustrates an example method of processing a payment request in accordance with a second embodiment of the friction-less purchasing technology. In this embodiment, the disclosed technology receives a payment request for a purchase transaction from a merchant system and uses a security code submitted by a customer at a merchant system as part of the purchase transaction to approve or deny the payment request.

The method 800 begins at block 805 when the auto-pay component receives a payment request associated with a purchase transaction from a merchant system or through a requesting application of the merchant system. The request may be generated as result of a customer selecting a payment field or button on the shopping page. The payment field is connected to a deep-link. In other words, the payment request may be in the form of a deep-link, which dynamically changes (e.g., in real-time) based on the items in the shopping cart and other such customer interactions with the requesting application. The payment service 108 dynamically updates the deep-link, in one implementation. The auto-pay component parses the payment request to extract a payment proxy associated with a payment object of the customer, at block 810. At decision block 815, the auto-pay component determines if the payment proxy is associated with one or more payment objects and if so, at decision block 820, the auto-pay component receives a security code and determines if the security code in the payment request matches the security code on one of the payment cards stored within the auto-pay component or a remote service. If so, the auto-pay component causes the processing of the payment request at block 830 by transferring a payment amount included in the payment request from an account associated with the payment card with the matching security code to a financial account associated with the merchant system. Alternatively, if the identifier is not associated with a payment card or the security code does not match, the auto-pay component provides a response declining the payment request at block 825.

Figure 9:
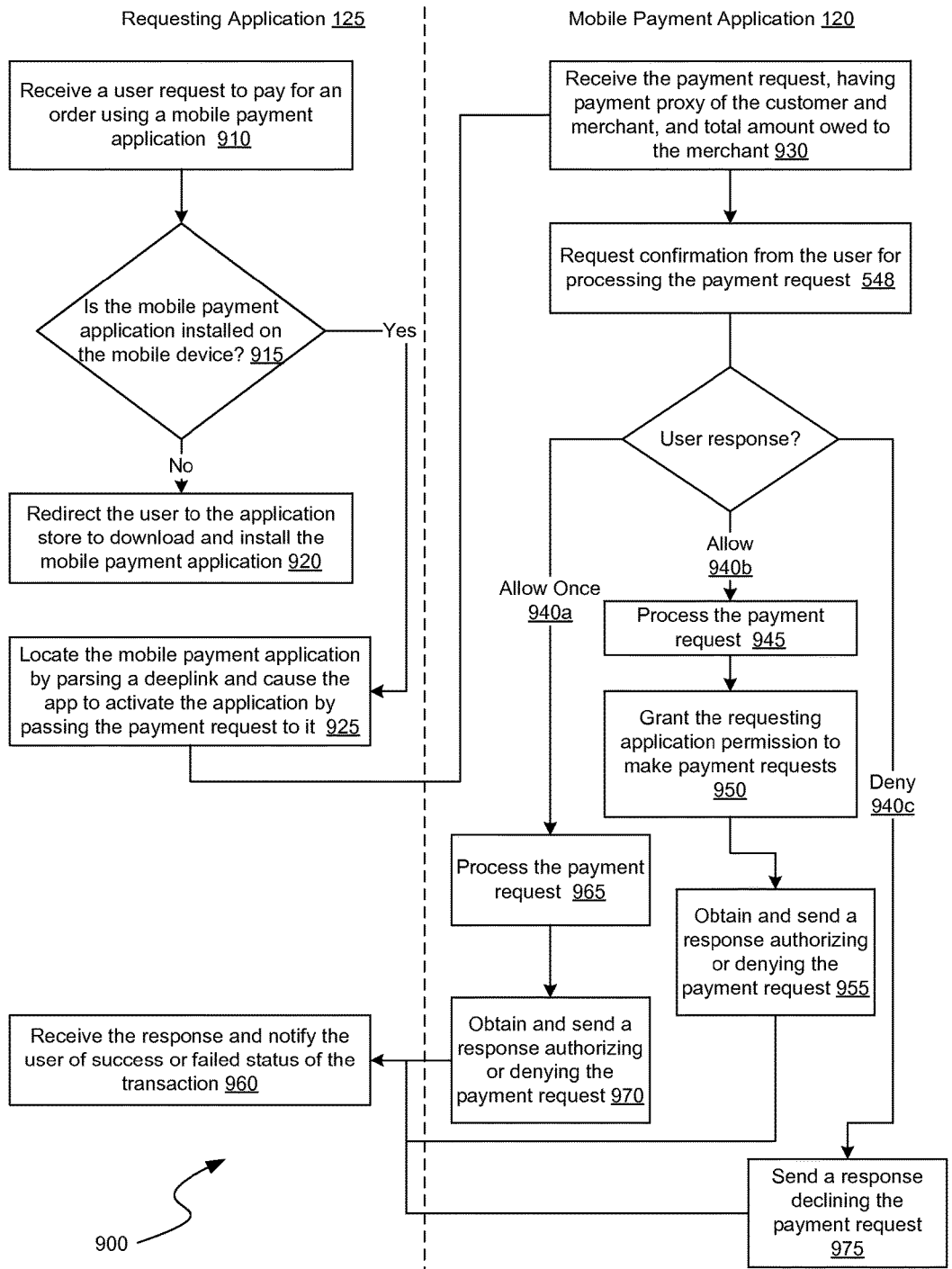
FIG. 9 is a flowchart that illustrates an example method of processing a payment request in accordance with an embodiment of the friction-less purchasing technology.

FIG. 9 is a flowchart that illustrates an example method of processing a payment request in accordance with a third embodiment of the friction-less purchasing technology. In this embodiment, a mobile payment application 120 on a mobile device processes a payment request initiated by a requesting application 125 on the same mobile device.

The method 900 begins at block 910, when the requesting application receives a user request to pay for an order in response to a selection of a payment field of the mobile payment application. An auto-pay component is invoked on selection of the payment field; the auto-pay component 109 determines the next course of action, based on various technologies or factors, such as mobile-deep-linking technology. For example, it may check, based on a static or dynamic deep-link embedded or associated with the payment field, whether the mobile payment application is installed and/or authenticated in a web browser. If the mobile payment application is not installed on the mobile device as determined at decision block 915, the user can be redirected to an application store on the mobile device to download and install the mobile payment application at block 920. If, on the other hand, the mobile payment application is installed on the mobile device, the requesting application can invoke or call the mobile payment application and pass a payment request to it at block 925. In one implementation, the location of the mobile payment application is located in a direct or deep-link along with other payment information, e.g., the payment proxy of the customer, the payment proxy of the merchant, and the total amount of the transaction. The payment request can also include details of the order, e.g., the description of items. The auto-pay component can parse the request to extract such information and provide to the mobile payment application. At block 930, the mobile payment application (or a background service listening to a call or Intent) can answer the call from the requesting application to handle the payment request. At block 935, the mobile payment application can request confirmation from the user for processing the payment request. If the user response is "allow once" 940*a*, the mobile payment application processes the payment request at block 965 as a one-time request by sending the payment request to the payment service system over a network. The payment request can include a device identifier, a mobile application instance identifier, communication identifier or the like appended to it, which can be used by the payment service system to identify a payment account to be used to pay for the order. At block 970, the mobile payment application obtains a response authorizing or denying the payment request 970 from the payment service system and sends the response to the requesting application via the auto-pay component. The requesting application receives the response and notifies the user accordingly at block 960. For example, if the authorization failed, the requesting application can notify the user of the failed transaction status.

If the user selects "allow" 940*b* as the response, the mobile payment application processes the payment request at block 945 and grants the requesting application permission to make subsequent payment requests to the mobile payment application at block 950. In other words, the next time the user selects the mobile payment application as a checkout option from the checkout user interface of the requesting application, the payment request from the requesting application is processed by the mobile payment application in the background without the user having to leave the requesting application. Since the user does not leave the requesting application and the payment requests are processed in the background, this method provides a seamless purchase experience for the user without sharing the user's payment card data to the requesting application. In some embodiments, the mobile payment application can generate and send the requesting application a token using which the requesting application can directly communicate with the friction-less payment system to request payments. The token can be uniquely associated with a user and the requesting mobile application, and can be invalidated at any time (e.g., by the user revoking or changing the permission, after a period of time, etc.) In the instance that the user response is a "deny" response 940*c*, the mobile payment application can send a response to the requesting application declining the payment request at block 975.

Figure 10:
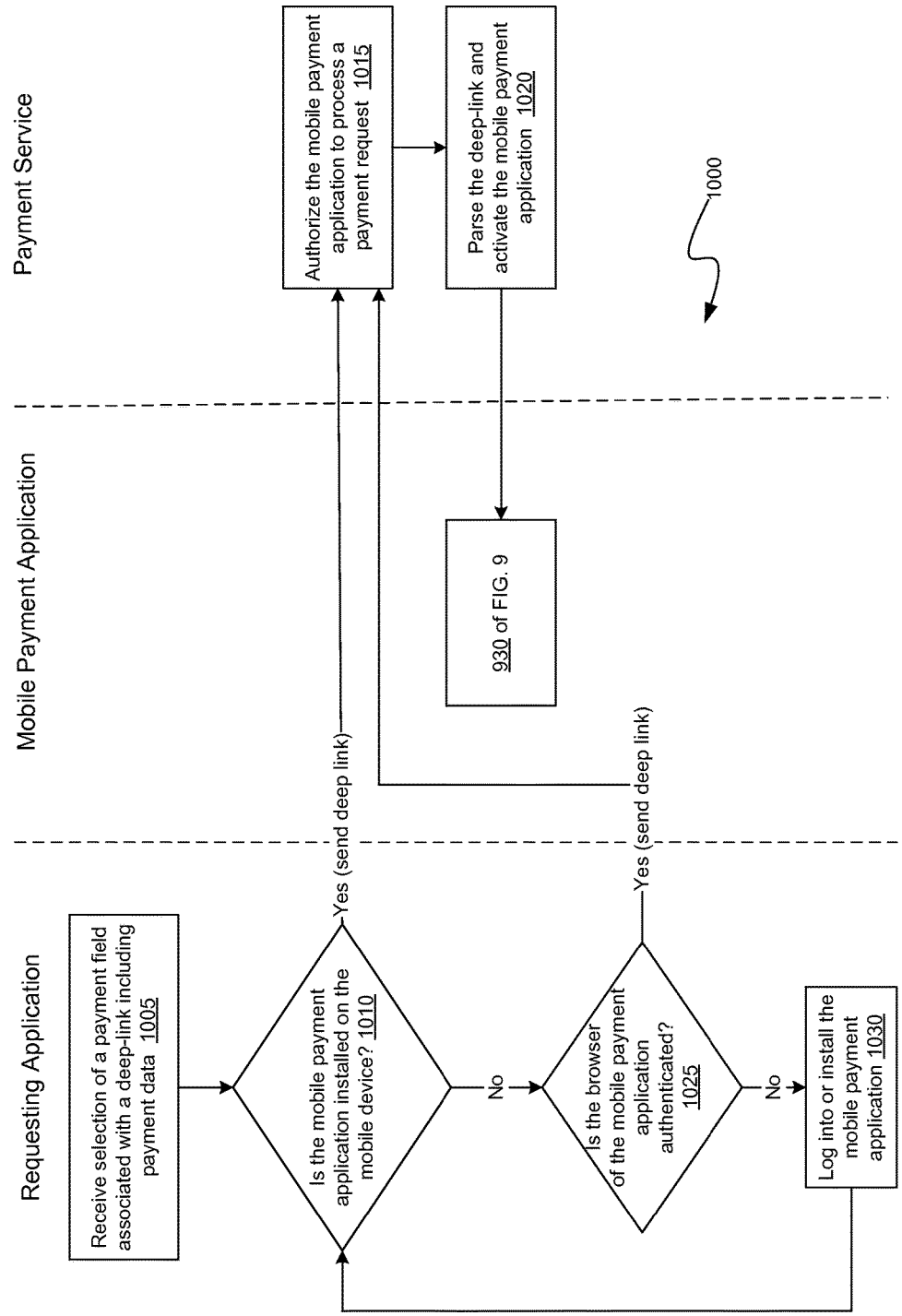
FIG. 10 is a flowchart that illustrates an example method of processing a payment request in response to a selection of a payment field in accordance with an embodiment of the friction-less purchasing technology.

FIG. 10 is a flowchart that illustrates an example method 1000 of processing a payment request by selecting a payment field, in accordance with another embodiment of the friction-less purchasing technology. In this embodiment, a payment service 108 processes a payment request initiated by selection of a payment field (e.g., payment field 520) in the requesting application 125, or the interface of the requesting application 125 requesting payment information from the customer (e.g., a check-out page).

The method 1000 begins at block 1005, when the requesting application receives a user request to pay for a payment transaction, via a payment field. In one implementation, the payment field can be a hypertext markup language (HTML) or JavaScript (JS) button that receives user selection in the form of a mouse click, tap, and the like. The payment field can be integrated within any requesting application, a mobile payment application, a forum, a social networking platform, a messaging application and so on, where the payment field is programmed to exchange the payment input data or embedded payment data across the Internet to and from the payment service 108.

Further, the payment field can be customized according to user preferences and credentials. The preferences and the credentials are saved in the device 102, merchant system 122, or the web browser displaying the requesting application, so, when the customer accesses the requesting application or the mobile payment application and selects the payment field, the payment field automatically loads with the customer's payment proxy or location of the mobile payment application on the device.

If the customer is using a private, secure mobile device, the payment field may include or use a deep-link (or direct-link), such that the customer does not need to enter identifying payment information, including recipient and sender financial information and the transaction summary of the items in an online shopping cart. Optionally, a webbrowser may authenticate and populate the deep-link based on past transaction history. In another implementation, the deep-link obtains transaction specific data collated and analyzed by the payment service 108, in real time and dynamically. For example, the payment service 108 changes the deep-link based on the transaction summary, the merchant's financial account information, etc.

If the customer is using a public, unsecured computer, customer may need to enter identifying information before or after selecting payment field; however, the deep-link technology can be implemented in such cases as well. In an alternate embodiment, the payment field can be provided as a payment option in an electronic wallet. The customer sets up a link to the payment button within the electronic wallet, so that the payment button appears as one of the payment sources in the electronic wallet while shopping or paying bills on-line.

When selected, the payment field can follow multiple paths, some of which are described herein. In one implementation, the auto-pay component 109 connected to the payment field makes a determination of which path to take. The auto-pay component 109 may be stored in the mobile device and/or the payment service 108.

For example, after selection of the payment field, an auto-pay component 109 connected to the payment field performs a first check to determine whether the customer has a payment proxy stored thereon. If yes, the auto-pay component 109 generates a payment request on behalf of the customer using the stored payment proxy information and submits to the payment service 108. This step has not been shown in the current figure but is discussed in detail in FIGS. 7A and 7B. If the payment proxy is not available or if the customer does not wish to use payment proxy, the flow transitions to decision block 1010, where the auto-pay component 109 (and/or the web browser and processor) performs another check to determine whether a mobile payment application is installed (e.g., as a software application) on the mobile device. For example, the auto-pay component 109 parses a deep-link associated with or embedded within the payment field and identifies sections within the deep-link, such as "mobilepaymentapp.me//platesus//200." In one example, a first section (identified by forward slashes) may be used to determine the location of the mobile payment application. The location may be in the form of a web address, IP address, and so on. In some cases, the first section is identical both for a mobile payment application stored on the customer device and a mobile payment application as a webpage. The auto-pay component 109 determines whether the mobile payment application is installed at the location defined by the first section, for example. If the mobile payment application is installed on the customer device ("Yes" branch of block 1010), the auto-pay component 109 sends a request to the payment service to authorize the use of the mobile payment application for the payment transaction. The auto-pay component 109 may also send the deep-link to the payment service 108 for further processing (see block 1015). At block 1020, the payment service 109 further parses and/or analyzes the deep-link and its sections to determine values corresponding to fields within the mobile payment application. For example, the mobile payment application has fields corresponding to the recipient payment proxy and the amount the sender owes to the recipient. The payment service 108 parses the deep link (e.g., "mobilepaymentapp.me//platesus//200" and identifies the second section as the recipient address and the third section as the payment amount. The payment service 108 populates corresponding fields within the mobile payment application with the identified values obtained from the deep-link to create a version of the payment request within the mobile payment application without or minimal user intervention and engagement, as shown in block 1020, and exemplified in user interfaces 520 and 570 (of FIGS. 5A and 5B). The method can then include steps shown in blocks 930-960 of FIG. 9 following block 978.

Referring back to block 1010, if the determination yields that a mobile payment application is not installed on the customer device, the transition flows into another decision block 1025, where it is determined whether a mobile payment application in the form of a webpage is authenticated in the web browser, in other words, whether a website of the payment service 108 is authenticated in the web browser, for example, as a result of a previous user or visit from the customer to pay for a transaction. An authenticated mobile payment application in a web browser does not require for a customer to login or enter his or her credentials. For example, the auto-pay component evaluates the same deep-link (and the same section of the deep-link) to route the flow from the requesting application to the mobile payment application in a web browser. The auto-pay component 109 also checks whether the payment service or the browser has authenticated the customer, e.g., through session identifiers, web cookies, session logs, web history, and the like. If the answer to the determination is a "Yes," the payment service 109 further parses and/or analyzes the deep-link and its sections to determine values corresponding to fields within the mobile payment application in the web browser, as shown in block 1015. For example, the mobile payment application in the web browser has fields corresponding to the recipient payment proxy and the amount the sender owes to the recipient. The payment service 108 parses the deep link (e.g., "mobilepaymentapp.me//platesUS//200" and identifies the second section as the recipient address and the third section as the payment amount. The payment service 108 populates corresponding fields within the mobile payment application with the identified values obtained from the deep-link to create a version of the payment request within the mobile payment application without or minimal user intervention and engagement, as shown in block 1020, and exemplified in user interfaces 520 and 570. The method can then include steps shown in blocks 930-960 of FIG. 9 following block 978, to process the payment transaction. In one implementation, the method includes sending an updated deep-link from the payment service 108 to the requesting application that appends information of the order confirmation number, payment service reference number, and/or status of the transaction into the deep-link.

Referring back to 1025, if the determination yields that the mobile payment application is neither installed nor a web version of the application is authenticated in a web browser, the user can be redirected to an application store on the mobile device to download and install the mobile payment application as shown in block 1030. Alternatively or additionally, the customer can enter authenticate the mobile payment application in a web browser, e.g., by logging into an account registered at the payment service 108, by creating an account with the payment service 108, or by adding payment information in specific fields of the user interface.

In the method above, various other technologies can be used to send and receive information besides deep-link, and as such, it is only an example. For example, direct hyperlinks or encrypted packets can be sent. Furthermore, the deep-link can be to a specific location within the application and not necessarily the 'home page.' Furthermore, even though the payment service 108 is requested to provide authentication, in some cases, the payment service 108 may be bypassed, for example, for subsequent requests or for requests coming from certain devices or customers.

Note that any and all of the embodiments described above can be combined with each other, except to the extent that it may be stated otherwise above or to the extent that any such embodiments might be mutually exclusive in function and/or structure.

Although the present subject matter has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

Regarding the processes 200, 300, 400, 500, 550, 700, 800, 900, and 1000 while the various steps, blocks or sub-processes are presented in a given order, alternative embodiments can perform routines having steps, or employ systems having steps, blocks or sub-processes, in a different order, and some steps, sub-processes or blocks can be deleted, moved, added, subdivided, combined, and/or modified to provide alternative or sub-combinations. Each of these steps, blocks or sub-processes can be implemented in a variety of different ways. Also, while steps, sub-processes or blocks are at times shown as being performed in series, some steps, sub-processes or blocks can instead be performed in parallel, or can be performed at different times as will be recognized by a person of ordinary skill in the art. Further, any specific numbers noted herein are only examples; alternative implementations can employ differing values or ranges. Unless contrary to physical possibility, it is envisioned that (i) the methods/steps described above may be performed in any sequence and/or in any combination, and that (ii) the components of respective embodiments may be combined in any manner. Note that any and all of the embodiments described above can be combined with each other, except to the extent that it may be stated otherwise above or to the extent that any such embodiments might be mutually exclusive in function and/or structure.

The above description provides specific details for a thorough understanding and enabling description of these embodiments. One skilled in the relevant art will understand, however, that the embodiments discussed herein may be practiced without many of these details. Likewise, one skilled in the relevant art will also understand that the embodiments can include many other features not described in detail herein. Additionally, some well-known structures or functions may not be shown or described in detail below, so as to avoid unnecessarily obscuring the relevant description. Some of the recurring terms are now defined.

Reference to an "embodiment" or "implementation" in this document does not limit the described elements to a single embodiment; all described elements may be combined in any embodiment in any number of ways. Furthermore, for the purposes of interpreting this specification, the use of "or" herein means "and/or" unless stated otherwise. The use of "a" or "an" herein means "one or more" unless stated otherwise. The use of "comprise," "comprises," "comprising," "include," "includes," and "including" are interchangeable and not intended to be limiting. Also, unless otherwise stated, the use of the terms such as "first," "second," "third," "upper," "lower," and the like do not denote any spatial, sequential, or hierarchical order or importance, but are used to distinguish one element from another. It is to be appreciated that the use of the terms "and/or" and "at least one of", for example, in the cases of "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Additionally, note that the terms "connected" or "coupled" and related terms used throughout the description are used in an operational sense and are not necessarily limited to a direct physical connection or coupling. Thus, for example, two devices may be coupled directly, or via one or more intermediary media or devices. As another example, devices may be coupled in such a way that information can be passed there-between, while not sharing any physical connection with one another. Based on the disclosure provided herein, one of ordinary skill in the art will appreciate a variety of ways in which connection or coupling exists in accordance with the aforementioned definition.

The term "communication network" may be any type of network known in the art, such as a local area network or a wide area network, such as the Internet, and may include a wireless network, such as a cellular network, a cloud network, a local wireless network, such as Wi-Fi and/or close-range wireless communications, such as Bluetooth and Bluetooth low energy, near field communications (NFC), a wired network, or any other such network, or any combination thereof. Accordingly, the network may include both wired and/or wireless communication technologies, including Bluetooth, Bluetooth low energy, Wi-Fi and cellular communication technologies like worldwide interoperability for microwave access (Wi-MAX), 3G, 4G, CDMA, digital subscriber line (DSL), etc., cloud computing technologies, as well as wired or fiber optic technologies. Additionally or alternatively, the communication network may be a mesh network. For example, in a wireless local area network (WLAN), network devices may be configured to receive and forward communications, which are ultimately destined for a different device. These types of networks are generically referred to as "mesh" networks, where network nodes may form a "mesh" of paths for which communications may travel to reach their destination. Wireless networks may use beacon transmissions to advertise the network's existence, as well as provide information about the network and capabilities associated with the network. Different kinds of beaconing mechanisms may be used, for example, one for infrastructure mode networks (also called basic service set (BSS) networks) and one for ad-hoc mode networks (also called independent basic service set (IBSS) networks). In infrastructure networks, access points (APs) are the entities responsible for generating beacons whereas in ad hoc networks, all network nodes (including user stations) participate in the generation of beacons. The ad hoc network beacons (referred to as IBSS beacons) are used to advertise the network (which consists of all the nodes) as a whole while the infrastructure network beacons (referred to as BSS beacons) are generated by an AP and meant to advertise the existence of only that individual AP. Components used for such communications can depend at least in part upon the type of network, the environment selected, or both. Protocols for communicating over such networks are well known and are not discussed herein in detail.

The term "beacons" refer to devices that use direct radio signal communication to directly communicate information wirelessly to other devices using mid-range to short-range radio signal protocols. In other words, the wireless beacons can directly communicate using radio signals without interaction with any intermediary devices between the communicating devices. Furthermore, a device can communicate information using radio signals, e.g. a user identifier, to another device without the devices engaging in a pairing process that requires user input and without requiring explicit user authorization to communicate with another device. The direct radio signal communication functionality can be performed by any appropriate computing device, e.g. wristwatch, a mobile phone, a portable music player, a tablet computer, a laptop computer, a personal digital assistant, a smartphone, a keychain beacon, or another handheld or wearable mobile device to name a few examples. The radio signals emitted by the devices for such wireless communication can be part of any appropriate standard for mid-range to short-range radio communications having an operable range of at least 1 meter and up to about 50 meters, e.g., Bluetooth, Bluetooth 4.0, and BLE. Other techniques, such as geo-fencing or sensors using global positioning system (GPS), may also be used for location determination. The radio signals described in this specification can be any appropriate type of signal, e.g., a broadcast or advertiser signal that indicates presence of the device to nearby devices, or a connection signal that transmits data to a connected nearby device, to name a few examples. In this specification, a device can be said to be "nearby," "neighboring" or "proximate" if the device is within the operable range for performing direct radio signal communication with another user device.

The term "logging in" or "checking in" may refer to the customer's action through an application to sign-in with personal credentials (e.g., provided at the time of registration) to conduct a payment transaction or to communicate messages to a server or a POS terminal, as the context requires. In essence, checking in constitutes a consent by the user to conduct a card-less transaction with the merchant. This consent differs from actual authorization of the transaction, which the user would provide, e.g., verbally, upon learning the amount of the transaction.

The term "cause" and variations thereof, as used throughout this description, refers to either direct causation or indirect causation. For example, a computer system can "cause" an action by sending a message to a second computer system that commands, requests or prompts the second computer system to perform the action. Any number of intermediary devices may examine and/or relay the message during this process. In this regard, a device can "cause" an action even though it may not be known to the device whether the action will ultimately be executed or completed.

The term 'parsing' refers to analyzing a message between components, devices or engines. Messages sent between discrete components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components. The grammar syntax itself may be presented as structured data that is interpreted and/or otherwise used to generate the parsing mechanism. Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

The Web is a service that provides graphical links among the computers in the Internet. This is accomplished with the HyperText Markup Language (HTML) that provides the functionality for creating user-friendly links among Web pages. Users of the Web employ Web browsers such as Chrome or Safari to browse the Web. The Web browsers can retain past information or history to make subsequent visits by the users easier. Many Web browsers have the capability to accept certain pieces (one or more packets) of information called cookies from Web sites visited. Cookies are transmitted by Web servers to the user (client) so that they are stored by the Web browser in the user's computer and read back by the server on subsequent visits by that user. The user's computer to the server automatically transmits the cookie on subsequent visits to that site. Servers can collect information about the user including product or site preferences or other personal information provided by the user, and write that information or an access key to that information into the cookie. Thus, the Web server can tailor the content presented to the user based on those preferences. All of this can be done transparently to the user. Cookies serve the purpose of identifying users and their preferences to Web sites over multiple visits to that site. Web browser authentication also includes initial validation of the mobile communication device and/or information entered into an application accessed via the web browser. The validation may be through the use of the secure hypertext transfer protocol (HTTPS) executed by the browser component in the device.

The term "component" or "engine" refers broadly to general or specific-purpose hardware, software, or firmware (or any combination thereof) components. Modules and engines are typically functional components that can generate useful data or other output using specified input(s). A module or engine may or may not be self-contained. Depending upon implementation-specific or other considerations, the modules or engines may be centralized or functionally distributed. An application program (also called an "application") may include one or more components and/or engines, or a component and/or engine can include one or more application programs.

The structure and/or operation of any of the components described herein may be combined, consolidated, and/or distributed in any number of ways to facilitate development and/or deployment. To this end, one may integrate the components into a common code base or in a facility that can dynamically load the components on demand in an integrated fashion. The components may be consolidated and/or distributed in countless variations through standard data processing and/or development techniques. Multiple instances of any one of the program components may be instantiated on a single node, and/or across numerous nodes to improve performance through load-balancing and/or data-processing techniques. Furthermore, single instances may also be distributed across multiple controllers and/or storage devices; e.g., databases.

If components are discrete, separate, and/or external to one another, then communicating, obtaining, and/or providing data with and/or to other components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), SOAP, process pipes, shared files, and/or the like.

While aspects of the described subject matter can be implemented in any number of different systems, circuitries, environments, and/or configurations, the embodiments are described in the context of the following exemplary system(s) and configuration(s). The descriptions and details of well-known components are omitted for simplicity of the description. It will thus be appreciated that those skilled in the art will be able to devise various arrangements that, although not explicitly described or shown herein, embody the principles of the present subject matter. Furthermore, all examples recited herein are intended to be for illustrative purposes only to aid the reader in understanding the principles of the present subject matter and the concepts contributed by the inventor(s) to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof.

Certain embodiments may be configured for use in standalone devices (e.g., PDAs, smartphones, laptops, PCs and/or the like). Other embodiments may be adapted for use in a first device (e.g., mobile phone, and/or the like), which may be connected to a second device (e.g., tablet computer and/or the like) via any type of connection (e.g., Bluetooth, USB, Wi-Fi, serial, parallel, RF, infrared, optical and/or the like) to exchange various types of data (e.g., raw signals, processed data, recorded data/signals and/or the like). In such embodiments, all or part of the data processing may happen on the first device, in other embodiments all or part of the data processing may happen on the second device. In some embodiments there maybe more than two devices connected and performing different functions and the connection between devices and processing may happen in stages at different times on different devices. Certain embodiments may be configured to work with various types of processors (e.g., ARM, Raspberry Pi and/or the like). Furthermore, such embodiments are configured to operate on a variety of mobile devices, web applications, mobile applications, POS topologies, payment cards, computer networks, and environments.

It should also be appreciated by those skilled in the art that any block diagrams, steps, or sub-processes herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown. The order in which the methods are described are not intended to be construed as a limitation, and any number of the described method blocks can be deleted, moved, added, subdivided, combined, and/or modified in any order to implement the methods, or an alternative combination or sub-combinations. Also, while steps, sub-processes or blocks are at times shown as being performed in series, some steps, sub-processes or blocks can instead be performed in parallel, or can be performed at different times as will be recognized by a person of ordinary skill in the art. Further any specific numbers noted herein are only examples; alternative implementations can employ differing values or ranges. Furthermore, the methods can be implemented in any suitable hardware, software, firmware, or combination thereof.

ADDITIONAL EMBODIMENTS

A method of transferring money from a customer to a merchant through a mobile payment application, the method facilitated by a payment service system associated with a payment service, the method comprising: launching, through an e-commerce application executing on a customer device, a user interface listing one or more items offered by the merchant; receiving, as input from the customer and in an online shopping cart associated with the e-commerce application, a selection of at least one item from amongst the items listed on the user interface; receiving, during checkout of the items in the shopping cart and in a mode-of-payment field on the web browser, a selection submitted by the customer specifying an indication to pay for the selected items in the shopping cart using a mobile payment application installed on the customer device, wherein the mobile payment application is associated with a customer's financial account information; in response to the selection of mobile payment application as a mode-of-payment, identifying, through an auto-pay component of the mobile device, at least one navigable link embedded within or linked to the selected mode-of-payment field; parsing, via the auto-pay component, the navigable link to extract a uniform resource identifier that points to a specific location within the mobile payment application; generating, via the auto-pay component and based on the parsing, a payment request including (a) a payment amount associated with the items in the shopping cart; and (b) a payment proxy indicative of the merchant's financial account information, wherein the payment proxy includes a monetary indicator preceding an alphanumeric character; launching, using the uniform resource identifier, another user interface of the mobile payment application, the other user interface being configured to receive an indication from the customer authorizing transfer of an amount of funds from the customer to the merchant, wherein the amount is derived from the payment amount associated with the items in the shopping cart; in response to the authorization, transmitting, by the customer device, an updated payment request to a payment service system, wherein the updated payment request includes the payment proxy associated with the merchant, a customer's financial account information associated with the mobile payment application, and the payment amount corresponding to the items in the shopping cart; identifying, by the payment service system, based on a stored association between the payment proxy and the merchant, a merchant financial account associated with the payment proxy, the stored association established in a registration of the payment proxy with the payment service system; and causing, by the payment processing system, a transfer of the payment amount from the customer's financial account to the merchant's financial account. The user interface of the e-commerce application is accessed by the customer from the customer device via a source selected from a group of: an application installed on the customer device; a webpage; a forum; a social networking platform; and a messaging application. The auto-pay component transitions from the user interface of the e-commerce application to the other user-interface of the mobile payment application by moving the user interface in a background while bringing the other user interface in a foreground of the customer device. Further, the auto-pay component transfers control from the other user interface of the mobile payment application to the user interface of the e-commerce application, after completion of the transfer of payment amount, by bringing the user interface in the foreground while moving the other user interface in the background of the customer device. The method further includes sending, by the auto-pay component, a notification to the customer device to request the customer to confirm or cancel the transfer of payment amount, the notification including information relating to the payment amount; and receiving, by the payment service system, a response from the customer device confirming the payment amount. The method further includes sending, by the auto-payment component, a notification of a status of the transfer of payment amount on the user-interface of the e-commerce application.

What is claimed is:

1. A method of paying for a transaction corresponding to an online purchase through a payment field on a requesting application associated with a third-party merchant system, the method comprising:

receiving, by an auto-pay component on a first user interface of the requesting application being accessed on a device, a selection of the payment field, wherein the selection indicates an intent of a customer to pay for the transaction through a customer payment proxy identifier in lieu of payment information or login credentials, wherein the customer payment proxy identifier refers to the payment information;

obtaining, by an auto-pay component associated with a payment service system, the customer payment proxy identifier stored in at least one database including a first local database associated with the device, a database associated with the payment service system, and a second local database associated with a web-server associated with a web browser displaying the requesting application;

determining, by the auto-pay component on the first user interface of the requesting application, a third-party merchant system payment proxy identifier stored in at least one database including the first local database associated with the device, the database associated with the payment service system, another database associated with the third-party merchant system, and the second local database associated with the web-server associated with the web browser displaying the requesting application;

causing a first switch from the first user interface of the requesting application to a second user interface of a mobile payment application associated with the payment service system;

transmitting, by the auto-pay component on the first user interface of the requesting application, a payment request to the mobile payment application, the payment request including:
  i) the customer payment proxy identifier associated with the requesting application;
  ii) a requesting application location identifier of the requesting application; and
  iii) a payment amount corresponding to the transaction, wherein the payment request is transmitted without redirecting the customer to a payment application associated with the payment service system;

causing a second switch from the second user interface of the mobile payment application back to the first user interface of the requesting application; and obtaining an indication that the transaction is complete after the payment request is processed.

2. The method of claim 1 further comprising:
sending, by the payment service system, a notification to the device to request the customer to confirm or cancel the transaction, the notification including information relating to the transaction; and
receiving, by the payment service system, a response from the device confirming the transaction.

3. The method of claim 2 further comprising:
assessing a level of risk associated with the payment request prior to sending the notification to the device, wherein the notification is sent to the device when the level of risk is lower than a threshold, wherein assessing the level of risk associated with the payment request includes assessing at least one risk factor including a purchase pattern associated with the customer, the payment amount, a frequency of payment requests in a given duration, a timing of the payment request or an identity of the third-party merchant system.

4. The method of claim 1, wherein the transaction between the customer and the third-party merchant system is completed without the customer having to register for or sign-in to an account with the third-party merchant system.

5. The method of claim 1, wherein extracting includes parsing a deep-link embedded in the payment field, wherein the deep-link is updated based on a customer interaction with the requesting application, and wherein the deep-link includes at least one of a location of the customer payment proxy identifier, a value of the customer payment proxy identifier, a location of the third-party merchant system payment proxy identifier, a value of the third-party merchant system payment proxy identifier, a location of the mobile payment application, a session identifier indicating whether the mobile payment application is authenticated in the web browser, a summary of the transaction, and a total amount owed to the third-party merchant system.

6. A method of processing a transaction between a customer and a merchant, the method comprising:
receiving, by a device of the customer, and on a first user interface of a requesting application associated with a third-party merchant system that is accessible by the device, an indication to pay for the transaction through a customer payment proxy identifier in lieu of payment information or login credentials, wherein the customer payment proxy identifier refers to the payment information, and wherein the indication is generated based on a selection of a payment field on the user interface;
automatically populating the payment field with the customer payment proxy identifier, the customer payment proxy identifier being stored in and fetched by the device of the customer;
using the customer payment proxy identifier to determine whether a financial account is associated with the customer;
causing a first switch from the first user interface of the requesting application to a second user interface of a mobile payment application associated with a payment service system;
generating a payment request using the customer payment proxy identifier, the payment request when submitted to the payment service system initiating a transfer of a payment amount from the financial account associated with the customer to another financial account associated with the requesting application to pay for the transaction;
transmitting the payment request, specifying the payment amount and a payment identifier corresponding to the requesting application, to the mobile payment application without redirecting the customer to the mobile payment application associated with the payment service system;
causing a second switch from the second user interface of the mobile payment application back to the first user interface of the requesting application; and
obtaining an indication that the transaction is complete after the payment request is processed.

7. The method of claim 6, wherein the first user interface of the requesting application is accessed by the customer from a computing device separate from the device of the customer.

8. The method of claim 6, wherein the first user interface of the requesting application is accessed by the customer from an application on the device of the customer.

9. The method of claim 6 wherein the device of the customer sends the payment request to the payment service system using a push notification service when the mobile payment application associated with the payment service system is installed on the device of the customer.

10. The method of claim 6, further comprising:
determining a risk score associated with the transaction; and
based on the risk score, determining an action for processing the transaction;
wherein the action includes sending the payment request to the device of the customer to obtain confirmation of the transaction when the risk score indicates that the transaction is unlikely to be a fraudulent transaction.

11. The method of claim 10 wherein the risk score is determined based on one or more risk factors including a purchase pattern associated with the customer, the payment amount, a number of transactions occurring in a given duration, a timing of the transaction or an identity of the merchant.

12. The method of claim 6, wherein the payment request further includes a requesting application location identifier.

13. The method of claim 6, further comprising:
sending, by the payment service system, a notification to the device of the customer to request the customer to confirm or cancel the transaction, the notification including information relating to the transaction; and
receiving, by the payment service system, a response from the device of the customer confirming the transaction.

14. The method of claim 6 further comprising obtaining the customer payment proxy identifier from a memory storage comprising a local database within the device of the customer separate from a web-browser displaying the requesting application.

15. The method of claim 6 further comprising:
associating an identifier to verify details associated with the payment request; and
generating notifications directed to the identifier, wherein the identifier is one of an e-mail address of the customer, a phone number of the customer, a verification code associated with a payment card of the customer.

16. The method of claim 14, wherein obtaining includes parsing a deep-link embedded in the payment field, wherein the deep-link is updated based on a customer interaction with the requesting application, and wherein the deep-link includes at least one of a location of the customer payment proxy identifier, a value of the customer payment proxy identifier, a location of a requesting application location identifier of the requesting application, a value of the requesting application location identifier of the requesting application, a location of the mobile payment application, a session identifier indicating whether the mobile payment application is authenticated in a web browser, a summary of the transaction, and a total amount owed to the requesting application.

17. A system for processing a transaction, comprising:
a memory;
a local database; and
a processor configured to execute instructions stored in the memory to:
receive, on a first user interface of a requesting application of a third-party merchant system that is accessible by a device of a customer, and in response to a selection of an interactive payment field, an indication to pay for the transaction through a customer payment proxy identifier in lieu of payment information or login credentials, wherein the customer payment proxy identifier has a syntax of a monetary indicator preceding an alphanumeric character;
populate the payment field with the customer payment proxy identifier, the customer payment proxy identifier being stored in and fetched by an auto-pay component, wherein the payment field is populated without signing in to an account and without registering with the third-party merchant system;
cause a first switch from the first user interface of the requesting application to a second user interface of a mobile payment application associated with a payment service system;
transmit a payment request;
cause a second switch from the second user interface of the mobile payment application back to the first user interface of the requesting application;
generate the payment request using the customer payment proxy identifier, the payment request when submitted to the payment service system initiates a transfer of a payment amount from a first financial account associated with the customer to a second financial account associated with the third-party merchant system to complete the transaction; and
facilitate the transfer of the payment amount, the transfer being based on payment information extracted via the local database.

18. The system of claim 17, wherein the transaction is initiated from a computing device that is separate from the device of the customer.

19. The system of claim 18, wherein the payment request is one of multiple payment requests initiated from multiple third-party merchant systems, and wherein the processor is further configured to assess a level of risk associated with each payment request and automatically block each payment request that is likely to be fraudulent based on the level of risk from causing a push notification to be sent to the device of the customer.

20. The system of claim 19, wherein the level of risk associated with each payment request is assessed based on a combination of risk factors including a purchase pattern associated with the customer, the payment amount, a number of payment requests in a given duration, a timing of the payment request or an identity of the third-party merchant system.

21. The system of claim 17, wherein the processor is further configured to:
associate an identifier to verify details associated with the payment request; and
generate notifications directed to the identifier, wherein the identifier is one of an e-mail address of the customer, a phone number of the customer, a verification code associated with a payment card of the customer.

22. The system of claim 17 wherein the auto-pay component is configured to control the interactive payment field, and wherein the interactive payment field when selected:
transmits the payment request having the payment amount and a payment identifier corresponding to the requesting application to the mobile payment application for display on the second user interface, wherein the mobile payment application is configured to transmit the payment request to the payment service system.

23. The system of claim 22, wherein the auto-pay component is further configured to parse a deep-link embedded in the payment field, wherein the deep-link is updated based on a customer interaction with the requesting application, and wherein the deep-link includes at least one of a location of the customer payment proxy identifier, a value of the customer payment proxy identifier, a location of a third-party merchant system payment proxy identifier, a value of the third-party merchant system payment proxy identifier, a location of the mobile payment application, a session identifier indicating whether the mobile payment application is authenticated in a web browser, a summary of the transaction, and a total amount owed to the third-party merchant system.

\* \* \* \* \*